(12) United States Patent
Jauss et al.

(10) Patent No.: US 12,255,902 B2
(45) Date of Patent: Mar. 18, 2025

(54) METHOD FOR HANDLING AN ANOMALY OF DATA, IN PARTICULAR IN A MOTOR VEHICLE

(71) Applicant: Robert Bosch GmbH, Stuttgart (DE)

(72) Inventors: Manuel Jauss, Wissgoldingen (DE);
Roland Steffen, Heimsheim (DE);
Mustafa Kartal, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 191 days.

(21) Appl. No.: 17/794,421

(22) PCT Filed: Mar. 15, 2021

(86) PCT No.: PCT/EP2021/056536
§ 371 (c)(1),
(2) Date: Jul. 21, 2022

(87) PCT Pub. No.: WO2021/197821
PCT Pub. Date: Oct. 7, 2021

(65) Prior Publication Data
US 2023/0073058 A1 Mar. 9, 2023

(30) Foreign Application Priority Data
Mar. 28, 2020 (DE) ................... 10 2020 204 056.7

(51) Int. Cl.
*H04L 9/40* (2022.01)
(52) U.S. Cl.
CPC ...... *H04L 63/1416* (2013.01); *H04L 63/0428* (2013.01); *H04L 63/1408* (2013.01)
(58) Field of Classification Search
CPC . H04L 63/14; H04L 63/1416; H04L 63/1433; H04L 63/1425; H04L 63/0428; G06F 21/55; G06F 21/552; G06F 21/554; G06F 21/56; G06F 21/566; G06F 21/577
See application file for complete search history.

(56) References Cited

U.S. PATENT DOCUMENTS

| | | | |
|---|---|---|---|
| 2017/0126663 A1 | 5/2017 | Blass | |
| 2017/0180341 A1 | 6/2017 | Walker et al. | |
| 2018/0129579 A1* | 5/2018 | Debnath | G06F 11/3065 |
| 2021/0409427 A1* | 12/2021 | Patel | H04L 43/062 |
| 2022/0182404 A1* | 6/2022 | Kishikawa | H04L 63/1416 |
| 2022/0398179 A1* | 12/2022 | Pelloin | H04L 41/069 |

FOREIGN PATENT DOCUMENTS

| | | |
|---|---|---|
| DE | 102018209407 A1 | 12/2019 |
| EP | 3528163 A1 | 8/2019 |

OTHER PUBLICATIONS

International Search Report for PCT/EP2021/056536, Issued Jun. 1, 2021.

\* cited by examiner

*Primary Examiner* — Shaqueal D Wade-Wright
(74) *Attorney, Agent, or Firm* — NORTON ROSE FULBRIGHT US LLP; Gerard A. Messina

(57) ABSTRACT

A method for handling an anomaly of data, in particular in a motor vehicle, is provided. At least one sensor obtains data for the anomaly detection. The sensor examines the obtained data for anomalies, and generates an event as a function of the associated data when an anomaly is detected. An event report is generated as a function of the event. The event report includes at least one variable that changes for each event report and/or is cyclically sent.

14 Claims, 12 Drawing Sheets

| | ① 267 | ⋮ 267.1 | ② 271 | ③ 273.X_V | ④ | ⑤ 273.X | ⑥ 285 |
|---|---|---|---|---|---|---|---|
| eventBuffer [0] | <=0% | ..<=10% | 2 | 0b10 = 2 | TRUE | 0b10 = 2 | 2 |
| eventBuffer [1] | <=0% | ..<=10% | 2 | 0b01 = 1 | TRUE | 0b01 = 1 | 4 |
| eventBuffer [2] | <=0% | ..<=10% | 2 | 0b10 = 2 | TRUE | 0b10 = 2 | 8 |
| eventBuffer [3] | <=10% | ..<=20% | 8 | 0b1100 = 12 | FALSE | 0b100 = 4 | 13 |
| eventBuffer [4] | <=10% | ..<=20% | 8 | 0b0101011 = 43 | TRUE | 0b0111 = 7 | 25 |
| eventBuffer [5] | <=20% | ..<=30% | 32 | 0b0110001 = 49 | FALSE | 0b01011 = 11 | 38 |
| eventBuffer [6] | <=20% | ..<=30% | 32 | 0b01100001 = 97 | FALSE | 0b10001 = 17 | 77 |
| eventBuffer [7] | <=30% | ..<=40% | 128 | 0b01100001 = 97 | TRUE | 0b01100001 = 97 | 190 |

METHOD FOR HANDLING AN ANOMALY OF DATA, IN PARTICULAR IN A MOTOR VEHICLE

FIELD

The present invention relates to a method for handling an anomaly of data, in particular in a motor vehicle.

BACKGROUND INFORMATION

A device and a method for handling an anomaly in a communications network, in particular of a motor vehicle, are described in German Patent Application No. DE 10 2018 209 407 A1. At least one detector analyzes a data stream in the communications network, the at least one detector detecting at least one anomaly via a rule-based anomaly detection method when at least one parameter for a data packet of the data stream deviates from a setpoint value, the at least one detector sending information concerning at least one detected anomaly via the communications network.

The automatic creation of a protocol, history, or report (logging), in particular for detected anomalies or events, should take place with high event rates and/or prolonged intrusions, without overloading and denying corresponding services. The entries of the logging or corresponding event reports should be authentic and available and should possess integrity. If possible, a history, which is nondeterministic for the intruder, should be created over an entire (long-lasting) intrusion. Manipulations and in particular deletion by an intruder should be avoided. Outside a control unit, the logging entries should be protected from unauthorized analysis. The logger should reliably send the event reports, for example via an interface, to an external node. After a successful transfer to the external node, the event entries may be locally deleted, particularly preferably after an in particular authenticated acknowledgment by the receiving entity. In addition, the logger should send a so-called heartbeat signal that indicates a network connection. The collection of events should be possible in order to reduce the number of logging entries to be processed.

Under normal operating conditions, there is little or no triggering of events, for example in the range of one event per hour. In the worst case, an intruder has full control over an interface, in particular an Ethernet interface. For a full bandwidth of 100 Mbit, for example, an intruder could send a maximum of 128,000 UDP (User Datagram Protocol, a network protocol) frames per second. Each one of such frames could possibly trigger an event (a detected anomaly in a data stream). Such an intrusion with a frequency of one attack over the lifetime of a vehicle is assumed. The allowed number of so-called write cycles of a memory, in particular a flash memory, is limited and must be taken into account. The number of active operating hours is likewise limited. The availability of the higher-order external data logger is likewise limited. Therefore, corresponding logging events or event reports must be buffered. It should be possible for all logging entries or event reports to be transferred to the higher-order data logger at least once per day.

For conventional intrusion detection systems (IDSs: systems for automated detection of intrusions on computer networks or computer interfaces) or intrusion detection and prevention systems (IDPSs), for which data in question are not relayed in the event of a detected intrusion attempt and the intrusion attempt is thus prevented, deterministic behavior and the limited resources of the embedded systems are often problematic.

It is desirable to provide a method for anomaly detection that is improved over the related art. This object may be achieved by the features of the present invention.

SUMMARY

This may be achieved by a method according to the features of the present invention. In accordance with an example embodiment of the present invention, a method is provided for handling an anomaly of data, in particular in a motor vehicle, at least one sensor obtaining data for the anomaly detection, the sensor examining the obtained data for anomalies, and generating an event as a function of the associated data when an anomaly is detected, an event report being generated as a function of the event, wherein the event report includes at least one variable that changes for each event report and/or is cyclically sent.

As the result of the event report including at least one variable that changes for each event report and/or being cyclically sent, the mode of operation of the anomaly detection is concealed from an intruder. Due to the cyclical sending of the event report, the intruder cannot reconstruct whether his/her intrusion has been detected or further communicated to the higher-order entity. The situation that old event reports are replayed, and thus replay attacks are generated, is thus prevented.

In one advantageous refinement of the present invention, it is provided that a random number and/or a time and/or a counter are/is used as a variable that changes for each event report. Due to the encryption in combination with the changing variable, the encrypted event report looks completely different (changed by only 1 bit) from a preceding or subsequent event report containing the same events. This further increases the security.

In one advantageous refinement of the present invention, it is provided that the event report is transferred to a higher-order entity in the motor vehicle and/or to a back end outside the vehicle.

In one advantageous refinement of the present invention, it is provided that an event manager obtains events from multiple sensors and creates the event report. The event report represents an extract of the events that have most recently occurred, and allows a corresponding precise analysis of the anomalies in the back end, for example, in particular with combination of different data sources.

In one advantageous refinement of the present invention, it is provided that the event report is cyclically transferred even if no new event has occurred since the most recent event report was sent. An intruder cannot foresee whether his/her intrusion has been detected and further communicated, since an event report is also cyclically sent during phases of an intrusion. As a result of the changeable variable and/or encryption, the dummy data as such are not discernible by the intruder. In the absence of a new event, the event report is particularly preferably created based on a dummy message.

In one advantageous refinement of the present invention, it is provided that the event report includes a piece of authentication information and/or at least one selected event and/or padding data. In this way, the higher-order entity may check whether authentic data are involved. For this purpose, it is particularly advantageously provided that the authentication information is formed by further pieces of information contained in the event report.

In one advantageous refinement of the present invention, it is provided that the event report always has the same length and/or is encrypted using a key. The intruder thus cannot see whether, or how many, events have been transmitted in the event report. As a result, the intruder cannot infer the context of the event report.

In one advantageous refinement of the present invention, it is provided that the event report is transferred cyclically and/or in encrypted form from the further entity for intrusion detection to a back end. A nondeterministic behavior of the communication channel between the higher-order entity and the communication adapter or event manager is thus ensured, in particular with regard to the feedback. This is also advantageously possible due to the fact that after proper receipt of the event report by the unit that receives the event report, an acknowledgment signal is sent to the unit, in particular the communication adapter, that sends the event report.

In one advantageous refinement of the present invention, it is provided that the sent event report is decrypted, and/or data contained in the event report are used to form a piece of authentication information that is compared to the authentication information contained in the event report, and an acknowledgment signal is sent when the formed pieces of authentication information match the obtained pieces of authentication information.

In one advantageous refinement of the present invention, it is provided that after the receipt of the acknowledgment signal, a signal for enabling or overwriting a memory is obtained, in which at least one selected event is contained as an integral part of the most recently sent event report. Further checking within the scope of an authentication is thus possible in a particularly advantageous manner.

Further advantageous embodiments of the present invention result from the following description, and the figures.

BRIEF DESCRIPTION OF THE DRAWINGS

FIG. 8 shows an association of certain variables used in FIG. 7.

DETAILED DESCRIPTION OF EXAMPLE EMBODIMENTS

Figure 1:
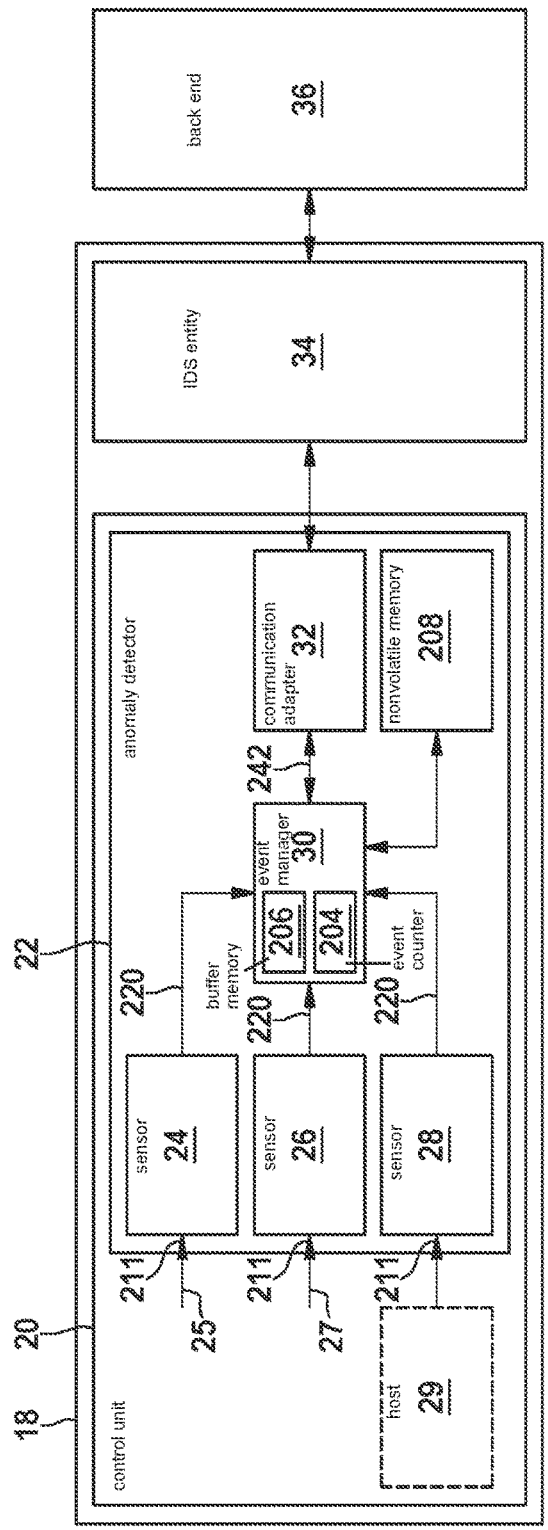
FIG. 1 schematically shows components of an anomaly detection.

In conjunction with aspects of the following embodiments, deviations from a normal behavior, which during actual operation may occur in data 211 (for example, data of a communication system, or system data) of an in particular networked system, are referred to below as an anomaly. The following are examples of possible causes: defects or completely failed sensors deliver incorrect data or no data at all, components of the system are damaged, the system has been manipulated by external, or also local or physical, attacks (a hacker attack, for example).

The detection of anomalies in data 211 is implemented with the aid of a so-called intrusion detection system (IDS or IDPS). In the following discussion, IDS refers to a system that monitors data 211 for anomalies. These may be, for example, data 211 for the data link in a communications network, via which control unit 20, for example a gateway, communicates on different communication channels (for example, via bus systems 25 or Internet 27). However, other data 211, for example system data within a control unit (or a host 29 situated therein or a microcontroller or processor, or within a chip) are also to be checked for anomalies via this IDS system. The detection of anomalies of data 211 takes place via suitable sensors 24, 26, 28. Sensors 24, 26, 28 are adapted to the particular source of data 211 (in the exemplary embodiment, bus systems 25, 27 or host 29).

According to FIG. 1, a control unit such as a gateway 20 is situated in a vehicle 18. Control unit or gateway 20 includes a processor/processors, memory, working memory (for example, as an integral part of a host system 29), and interfaces for a communication via a communications network. Gateway 20 executes, for example, instructions for the data link. The communication results in data 211 in the form of data packets. Data 211, for example system data, also result during operation of host 29. In a normal state, setpoint values, for example with regard to the recipient address and destination address, observance of correct program sequence (for host 29, for example), time stamp, frequency of occurrence or frequency of data 211 of certain data packets, are adhered to. Data 211 of data packets are exchanged in order to fulfill the specific tasks between further control units or components, not shown in greater detail, in vehicle 18. Gateway 20 is used to couple multiple communication systems or interfaces, for example a CAN bus 25, an Ethernet connection 27, and a data link to host system 29, which is an integral part of control unit 20 or of the gateway. However, other communication systems (for example, further wired bus systems such as LIN, CAN FD, etc. or wireless networks, for example, WLAN or Bluetooth) may be coupled to one another via gateway 20 for purposes of data exchange. In general, an intrusion detection system IDS or anomaly detector in a control unit is used to monitor all data 211 (data 211 received by the communication system as well as data 211 generated within control unit 20 by host 29) for corresponding anomalies. In the exemplary embodiment, the IDS functional mechanism is described for gateway 20 as an example. In general, however, the described functionalities of the anomaly detector or intrusion detection system IDS may be implemented in any arbitrary control unit or arbitrary electronic components. In particular, the use is not limited to a vehicle 18. Rather, arbitrary communication components, for example communication modules in the Internet (Internet of things (IOT)) or in networked production systems, may be equipped with the described functionalities.

A communication component such as control unit or gateway 20 includes at least one anomaly detector 22. Data 211 entering via the interfaces of particular communication systems 25, 27, 29 are in each case led via so-called sensors 24, 26, 28 for the anomaly detection or intrusion detection, referred to as IDS sensors for short. Appropriate sensors 24, 26, 28 are thus situated in gateway 20. Such sensors 24, 26, 28 are used to detect whether obtained data 211 represent an anomaly. For this purpose, appropriate filter algorithms or rule sets which are used to detect and classify anomalies are stored in sensors 24, 26, 28. If an anomaly is ascertained by a sensor 24, 26, 28, the corresponding data packet of data 211 is classified as an event 220 (of an attempted intrusion). In general, depending on source 25, 27, 29, sensors 24, 26, 28 may classify (association of particular event 220 with certain event types 218) and detect different anomalies as events 220. Sensors 24, 26, 28 compile certain event-dependent metadata 216 as an associated event 220, based on particular event type 218 (different types of anomalies in data 211). In addition, event-dependent metadata 216 may also contain data or data components of anomalous data 211. Event 220 generated in this way is relayed to an event manager 30. Sensors 24, 26, 28 are generally designed to relay associated data 211 of a communication system (bus systems 25, 27, for example) to the destination address when an anomaly is not present. For a detected anomaly, sensors 24, 26, 28 could be designed in such a way that associated data 211 of a communication system (bus system 25, 27, for example) are not relayed to the destination address. Alternatively, sensors 24, 26, 28 may also be used to reduce events 220 (reduced event or pre-reduced event 221). Due to this reduction, event manager 30 could be relieved of load, for example by only a small portion of useful data of anomaly-containing data 211 or data packets being relayed. This is advantageous in particular for large data volumes, such as those occurring with Ethernet connections.

Thus, for example, IDS CAN sensors 24 are used for anomaly detection for a CAN bus 25, IDS Ethernet sensors 26 are used for an Ethernet system 27, and IDS host sensors 28 are used for a host system 29. Depending on the different communication paths and communication protocols, even further IDS sensors may be provided which are capable of detecting and optionally classifying anomalies in the particular sources or anomaly sources.

IDS CAN sensors 24 detect relevant events 220 of associated event types 218 such as invalid CAN IDs, invalid message frequencies, invalid message lengths, or the like. IDS Ethernet sensors 26 detect events 220 of associated event types 218 that are relevant for Ethernet 27, such as invalid addresses or MAC addresses, invalid message frequencies, invalid message lengths, or the like. IDS host sensors 28 detect events 220 of associated event types 218 that are relevant for host system 29, such as invalid code executions, corruption of programs, stack counters, or the like. Particular event types 218 are often provided with an event-specific event ID. There are numerous predefined event types 218 for various data sources with associated unique event IDs.

The following further anomalies may be taken into account as events 220 for further event types 218. For example, these are events 220 or event types 218 that are to be associated with the firewall, such as loss of the frame due to a full buffer memory, filter violation (stateless/stateful), limitation of the transfer rate active or inactive, monitoring mode activated or deactivated, context change. Even further anomalies that relate to host system 29 may be taken into account as events 220 with associated event types 218, for example excessive CPU load, memory access violation, errors in the code execution, ECU reset detected, log entries in the nonvolatile memory corrupted, overflow of the logging memory, rejection of an event, change of MAC address port, etc.

Event manager 30 is used to further process incoming events 220 or event-dependent metadata 215 contained in particular event 220. In particular, event manager 30 is used to aggregate, format, or prepare events 220 and/or to prioritize and/or reduce/select events 220 and/or to store or persist or permanently store selected and/or reduced events 220, 221. In particular, event manager 30 decides which incoming events 220 are to be further processed. The events that are selected from incoming events 220 are referred to as selected events 226. The appropriate selection is to take place as nondeterministically as possible. In addition, event manager 30 particularly preferably provides incoming events 220 or selected events 226 with yet further generic metadata 217. As a result, events 220 that are transmitted by different sensors 24, 26, 28 may be regarded as higher level, for example by adding the number of occurred events, the associated time stamp or time signal 224, or the like within the scope of generic metadata 217. Furthermore, it is ensured that even in the event of a so-called event burst, a sufficiently large number of meaningful events 220 may be stored as selected events 226.

Event manager 30 exchanges signals with a communication adapter 32 of the intrusion or anomaly detection. Communication adapter 32 functions as a communication means for the data exchange between event manager 30 and further components 34, 36 outside anomaly detector 22 of control unit or gateway 20. In particular, communication adapter 32 is used as an interface for the data exchange between event manager 30 and further IDS entities 34 (preferably inside vehicle 18) and/or a back end 36 (preferably outside vehicle 18). Further IDS entity 34 may be only optionally provided.

To increase the security, event manager 30 could carry out a random reduction and prioritization of events 220, 221 that is nondetermininistic for and concealed from an intruder. Thus, random, nonvolatile storage of selected events 226 could be carried out in a way that is nondetermininistic for and concealed from the intruder. The random selection could be based, for example, on a random number 273 that is unique to a certain control unit. Event manager 30 may likewise carry out a random storage of counter contents 231 of event counters 204. In addition to event-dependent metadata 216, event manager 30 also randomly stores added generic metadata 217 as selected events 226.

To increase the security, communication adapter 32 could carry out random uploading or sending of an event report 242 to the other IDS entities 34 in a way that is nondetermininistic for and concealed from the intruder. The random uploading could be based, for example, on a random number 273 that is unique to a certain control unit (or gateway 20). Certain events 220 could thus be cyclically transmitted with encryption within the scope of event report 242. Even if no new events 220 are present, so-called dummy events in the format of an event report 242 could be cyclically transmitted with encryption. This is used to protect against eavesdropping or to randomly conceal the data exchange between communication adapter 32 and further IDS entities 34 or back end 36.

Figure 2:
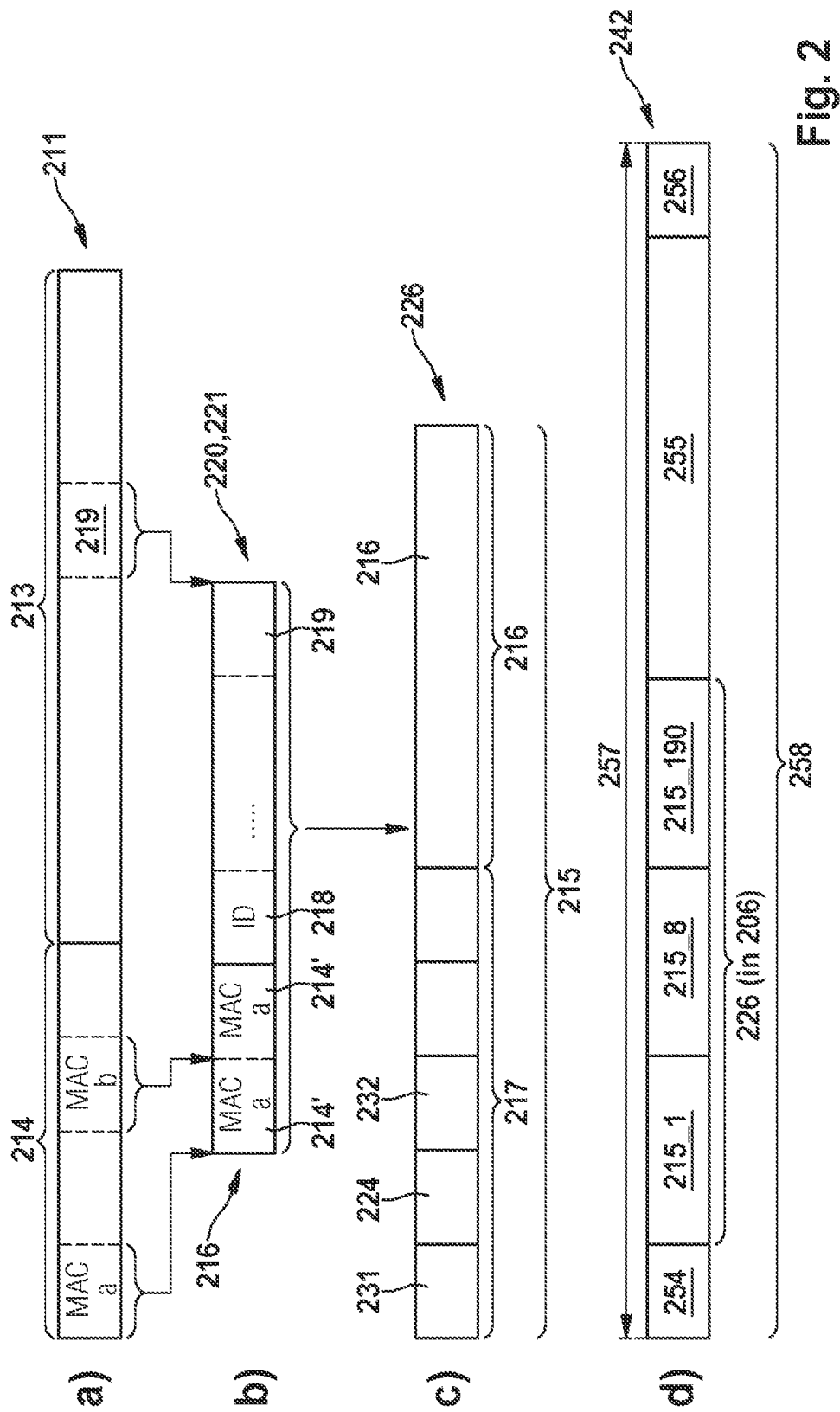
FIG. 2 shows an example of a configuration or interaction of received data, an event derived therefrom, a configuration of the associated selected event, and an event report.

As an example, in conjunction with FIG. 2 it is shown how data 211 are further processed by sensor 24, 26, 28 in the event of a detected anomaly and sent to event manager 30 until the event manager sends an event report 242 via communication adapter 32.

FIG. 2a shows by way of example a data packet of data 211 as may occur, for example, in a network frame (CAN, Ethernet, for example). Data 211 include a header 214 that includes, for example, the source address and the destination address (MACa, MACb, for example). In addition, data 211 include useful data 213.

As explained in greater detail below, sensor 24, 26, 28 could optionally randomly select a useful data range 219, which is relayed to event manager 30. Sensor 24, 26, 28 has ascertained that this is an anomaly according to a certain event type 218 (event ID or ID). Therefore, sensor 24, 26, 28 generates event-dependent metadata 216 as illustrated in FIG. 2b. Depending on event type 218 (or ID), different pieces of information concerning the anomaly could be stored for event-dependent metadata 216. In the exemplary embodiment, the source address and destination address (MACa, MACb), event type 218, and selected useful data range 219, among others, are used as event-dependent metadata 216.

Alternatively, event-dependent useful data 213 could also be relayed to event manager 30 completely within the scope of event 220.

Alternatively, event 220 could also include no event-dependent useful data 213, for example when host 29 is used as the source. This may involve event types 218 such as information concerning loss of the data frame due to a full buffer, activation or deactivation of the observation mode, excessive load on the CPU, corruption of entries of non-volatile memory 208, overflow of the logging buffer, active event reduction, or the like.

In addition, for different event types 218, further event-dependent information within the scope of event-dependent metadata 216 may be an integral part of event 220. For event type 218 "change of context," event-dependent metadata 216 could include, for example, the context, for example with a size of 32 bits. For event type 218 "memory access violation" or "code execution violation," event-dependent metadata 216 could include, for example, the accessed address (32 bits, for example), the program counter (32 bits, for example), the task ID (8 bits, for example). For event type 218 "detected reset of a control unit," event-dependent metadata 216 could include, for example, the reason for the reset (8 bits, for example), for example point of return (POR), software reset, exceptions, etc.

Subsequent Ethernet-based events 220 could be logged as event-dependent metadata 216, such as static/state-dependent filter violations (certain rule ID or ID for certain event type 218 (16 bits, for example), an ID of the filter rule that caused event 220, if available, physical port address, physical port ID via which the frame was obtained, source address (MAC address, for example, 48 bits, for example), destination address (MAC address, for example, 48 bits, for example), possibly the IP address of the source or destination, determination of the UDP/TCP port (16 bits, for example) if present in the frame (optional)). Alternatively, static/state-dependent filter violations could be concurrently logged, for example rule ID, physical port, frame (number of bytes) in which a certain number of bytes of the received frame are stored, selected useful data range 219 (certain number of bytes), selected useful data range 219 of the bytes of the original frame, useful data range 219 index (16 bits, for example), start byte of selected useful data range 219 in the original frame. Even further Ethernet-based events could be contained in events 220 that are transmitted to event manager 30, for example for event type 218 "transfer rate limited (active/inactive)," the rule ID with associated ID of the filter rule that has caused event 220, for event type 218 "change of context," the context (32 bits, for example), for event type 218 "address hopping" or "MAC hopping," the old port (physical port ID that was originally associated with the address), the new port (physical port ID where the address has been recently observed), the address, preferably the MAC address. However, event types 218 without metadata 216, for example "loss of frame due to full buffer," etc., may also occur.

The relaying of event-dependent useful data 213 is thus in particular a function of the source of data 211 having associated event type 218. Metadata 216 are transferred to event manager 30 as event 220 or reduced event 221 (due to the random selection or reduction of useful data range 219 to be transferred in sensor 24, 26, 28).

If event manager 30 selects this event 220, 221 (selected event 226) for further processing as explained in greater detail below, generic metadata 217 are also added to event-dependent metadata 216, resulting in metadata 215 shown in FIG. 2c. These generic metadata 217 are generally generated in event manager 30. These are, for example, output signals of event counters 204, i.e., present counter contents 231, concerning which number of global event 220 or which number of event of a certain event type 218 that is involved for present event 220. In addition, generic metadata 217 may include a time signal 224, for example, indicating when this event 220 occurred. Furthermore, metadata 217 could include the particular length 232 (size of the data) of event-dependent metadata 216 or of complete metadata 215. This is advantageous for the subsequent memory management of buffer memory 206.

The following generic metadata 217 are proposed as an example. This could be, for example, an event type 218 within the scope of an event ID (8 bits, for example). This event ID of event type 218 is unique, and may include type-length-value (TLV)-based encoding, for example. Generic metadata 217 include length 232, for example between 8 and 16 bits in size. The size of the data (metadata 215) follows the length field in bytes, with a maximum of 255 bytes. TLV-based encoding could once again be provided. Time signal 224, a time stamp (64 bits, for example), is also included. Time 224 is indicated, for example, in the form of an absolute time value that has elapsed since a reference point in time, such as Jan. 1, 1970 (in milliseconds) for indicating a unique time stamp. In addition, generic metadata 217 may include counter contents 231 or starting values 231 of event type counter 204 (32 bits, for example) and/or counter content 231 of global (event) counter 204 (32 bits, for example), a sum of all counter contents 231 of event counters 204 for each event type 218.

Event-dependent metadata 216 are accepted as particular sensor 24, 26, 28 has formed them. This event 220 together with corresponding metadata 215 formed by sensor 24, 26, 28 and by event manager 30 is stored in buffer memory 206 of event manager 30. As explained in greater detail below, even further events 226 selected or reduced by event manager 30 (in the exemplary embodiment according to FIG. 2d, referred to as 215_1, 215_8, 215_190 as an example) are similarly stored in buffer memory 206.

An event report 242 is now generated from selected events 226 (in the exemplary embodiment according to FIG. 2d, referred to as 215_1, 215_8, 215_190 as an example (metadata 215 event number 1, metadata 215 event number 8, metadata 215 event number 190 as examples of selected events 226)) stored in buffer memory 206. This event report includes selected events 226 (in the example, 215_1, 215_8, 215_190) that are stored in buffer memory 206. These selected events 226 are preceded by a variable 254 (for example, a random number, time, or counter, etc.) that is changed with regard to each event report 242. In addition, event report 242 includes a piece of authentication information 256, via which the authentication between communication adapter 32 or event manager 30 and the unit (IDS entity 34, back end 36, or the like) that receives event report 242 may take place. Event report 242 has a fixed length 258. To achieve this fixed length 258, data 254, 215_1, 215_8,

215_190, 256 are additionally filled by so-called padding data 255. These padding data 255 contain no event-relevant information. Prior to a transfer, the shown data of event report 242 are provided with encryption 258 as indicated in FIG. 2*d*. Event report 242 that is encrypted in this way by encryption 258 is sent from communication adapter 32, and is decrypted and authenticated by further IDS entity 34 or back end 36, as described.

IDS sensors 24, 26, 28 relay events 220 or reduced events 221 to event manager 30. In particular for Ethernet networks, in the event of an intrusion attempt, for a plurality of events 220 to be relayed having large data volumes or event-dependent metadata 216, a memory 206, in particular a volatile memory or buffer memory 206, very quickly can no longer accept all events 220. This is due to the high data transfer rate or high data volumes that may be transferred. Therefore, it may make sense for one or multiple IDS sensors 24, 26, 28 to already carry out a preselection of events 220 to be relayed and/or a data reduction (reduced events 221) according to certain criteria. These criteria should be characterized by low predictability.

For IDS sensors 24, 26, 28, in particular for IDS Ethernet sensors 26, for increasing the security, the selection of certain events 220 to be relayed and/or the reduction of the events to reduced events 221 preferably takes place randomly. A random or arbitrary selection or a reduction of certain events 220 or data blocks of an Ethernet frames takes place in a way that is nondeterministic for and concealed from an intruder. The random selection or reduction could be based, for example, on a random number 273 that is unique to a certain control unit. In the simplest case, the same random number 273 could also be used for the other random scenarios as a reference in event manager 30 for reducing or prioritizing all events 220, the random storing of events 220, or the like. Alternatively, appropriate random numbers could also be regenerated anew in the control unit.

Incoming messages or data 211 typically include appropriate pieces of header information 214 (certain address data, for example), followed by useful data 213. Many pieces of header information which are not absolutely necessary for the anomaly evaluation are usually contained. According to the present invention, only certain address portions that are absolutely necessary are relayed as an integral part of a reduced event 221 within the scope of event-dependent metadata 216, for example the address of the source (MAC address, for example, 48 bits, for example), the address of the destination (MAC address, for example, 48 bits, for example), and the ID number that has resulted in an anomaly (event type 218). Other pieces of information, such as possibly the physical port or port ID where the frame was received, the IP address of the source or destination, information about the UDP/TCP port of the source or of the destination, if such information is contained in the frame, do not have to be transmitted, or completely transmitted, in event 220.

However, useful data range 219 that is selected or to be relayed is randomly selected from useful data 213 of incoming data 211, as also already explained in conjunction with FIGS. 2*a* and 2*b*. Thus, for example, the number of the start date (beginning of the memory area of the useful data to be transferred, for example byte number xyz) could be randomly established (for example, transferring a data range whose initial value was randomly ascertained, for example useful data byte number 538 for this event 220). The offset of selected useful data range 219 (number of transmitted data, for example 10 bytes) could be chosen to be fixed. Thus, the useful data bytes having numbers 538 through 547, in addition to the minimum address information (source address, destination address), would be relayed to event manager 30 as selected useful data range 219 within the scope of event 221 thus reduced. Alternatively, the offset of selected useful data range 219 (number of transmitted useful data) could also be varied, preferably randomly. Selected useful data range 219, in particular the starting range or end range of selected useful data range 219, is preferably based on a random number 273. This random number 273 is particularly preferably a function of control unit or gateway 20. Random number 273 is particularly preferably unique, i.e., assigned once only for this particular control unit.

However, random number 273 may optionally also be renewed. This results in the following advantages. By replacing the random number, for the same intrusion sequence (sequence of events 220) different events 220 are logged or selected. This is also the case when the intrusion takes place only on a single control unit/vehicle 18 and not on the entire fleet, as shown in the following assumption/example:

1. Multiple repetitions of the same intrusion sequence (sequence of events 220)
2. Random numbers 273 are renewed between intrusion sequences
3. Within the scope of an intrusion sequence, not all events 220 can be logged or selected (event burst). An event reduction for event report 242 follows
4. An event report 242 containing reduced events 221 is completely relayed to higher-order entity 34, 36 between two intrusion sequences. After multiple repetitions of the same intrusion sequence, the complete intrusion sequence may thus be reconstructed via event reports 242.

Sensor 26 could preferably adapt the selection of random number 273 or the various ranges of random number 273 to the size of incoming data 211, in particular to the size of incoming useful data 213. If useful data 213 have a smaller data range, random number 273 must be selected in such a way that the selection of a certain reduced useful data range 219 also falls only into this small data range of useful data 213. Random number 273 or the range of random number 273 under consideration must thus be correspondingly small. However, if incoming useful data 213 have a very large data range, random number 273 or the range of random number 273 under consideration must be selected to be large enough that the selection of a certain reduced useful data range 219 may also cover this large data range of useful data 213. Random number 273 is thus correspondingly larger.

Due to the fact that random number 273 has been uniquely assigned to a particular control unit 20, if further control units are present, the complete message (which has also gone to the further control units and has likewise been relayed with appropriate detection and reduction, using appropriately equipped sensors 26 at that location) could possibly be combined with the complete data range during an analysis in back end 36 by compiling a large number of reduced events 221 of multiple control units. This is because other control units with the same sensor function as described also now randomly select other useful data ranges 219 (including other randomly selected start addresses or end addresses), which after the compiling of multiple reduced events 221 may cover a large portion of (useful) data range 213 or the complete data range of useful data 213, based on the subranges or selected useful data ranges 219 of the various control units. Thus, various control units could reconstruct an event 220 from reduced events 221 or selected useful data range 219, for example by partial data range 538 through 547 (of the one selected useful data range 219) being provided by the one control unit, partial data range 548 through 557 (of a further selected useful data range 219) being provided by a further control unit, partial data range 558 through 567 (of a further selected useful data range 219) being provided by a further control unit, and particular selected useful data ranges 219 being combined once again, for example in a higher-order control unit or in back end 36, to form complete (useful) data range 213. This is the case in particular for a so-called broadcast attack on the entire vehicle fleet or a so-called multicast attack on portions of the vehicle fleet.

The random ascertainment of the start and/or the end of relayed or selected useful data range 219 is preferably carried out anew after certain events (cyclically, start-up of the control unit, reset of a control unit, etc.). For this purpose, for example random number 273 could be generated anew. Alternatively, some other range of random number 273 could be used for generating the start and/or end of the data range or of selected useful data range 219 to be relayed.

Processed reduced events 221 are relayed from sensor 26 to event manager 30. Thus, event manager 30 does not obtain complete data streams of these net frames from this sensor 26, but, rather, obtains only reduced events 221 with reduced data size. The reduction of events 221 to be relayed has been described by way of example, based on an IDS Ethernet sensor 26. However, in principle this could also be implemented in other IDS sensors 24, 26, 28. However, due to the high information content in an Ethernet frame with high transfer rates, specifically such events 220 would quickly result in an overflow of buffer memory 206. For IDS CAN sensors 24, data 211 in question occur with a low data rate and a low data volume anyway, so that generally speaking, complete events 220 may be passed on and stored here. However, in principle the data could also be reduced there, as correspondingly described.

In principle, the following steps for reducing events 220 thus take place in sensor 24, 26, 28. Data 211 are received from sensor 24, 26, 28 and/or data 211 are evaluated as to whether an anomaly is present. Data 211 are reduced when an anomaly is present. The reduction takes place by reducing the address range or header 214 and/or the data range or useful data 213. The reduction of address range 214 could take place by selecting the destination address and/or the source address. The reduction of useful data 213 takes place randomly. The reduction of useful data 213 takes place randomly by random selection of a start value and/or an end value of a subrange of useful data 213. The offset of the data range (number of transmitted data) is fixed at a certain value. Reduced events 221 are transmitted to event manager 30. Reduced events 221 contain reduced address data and/or reduced or selected useful data 219. Updating of random number 273 takes place as a function of certain system states (cyclical, start-up, reset, etc.). Alternatively, an update of random number 273 could take place randomly and/or in a time-controlled manner. Random number 273 or ranges of random number 273 for determining the start range or end range of selected useful data range 219 may be a function of the size of useful range 213 of received data 211.

Figure 3:
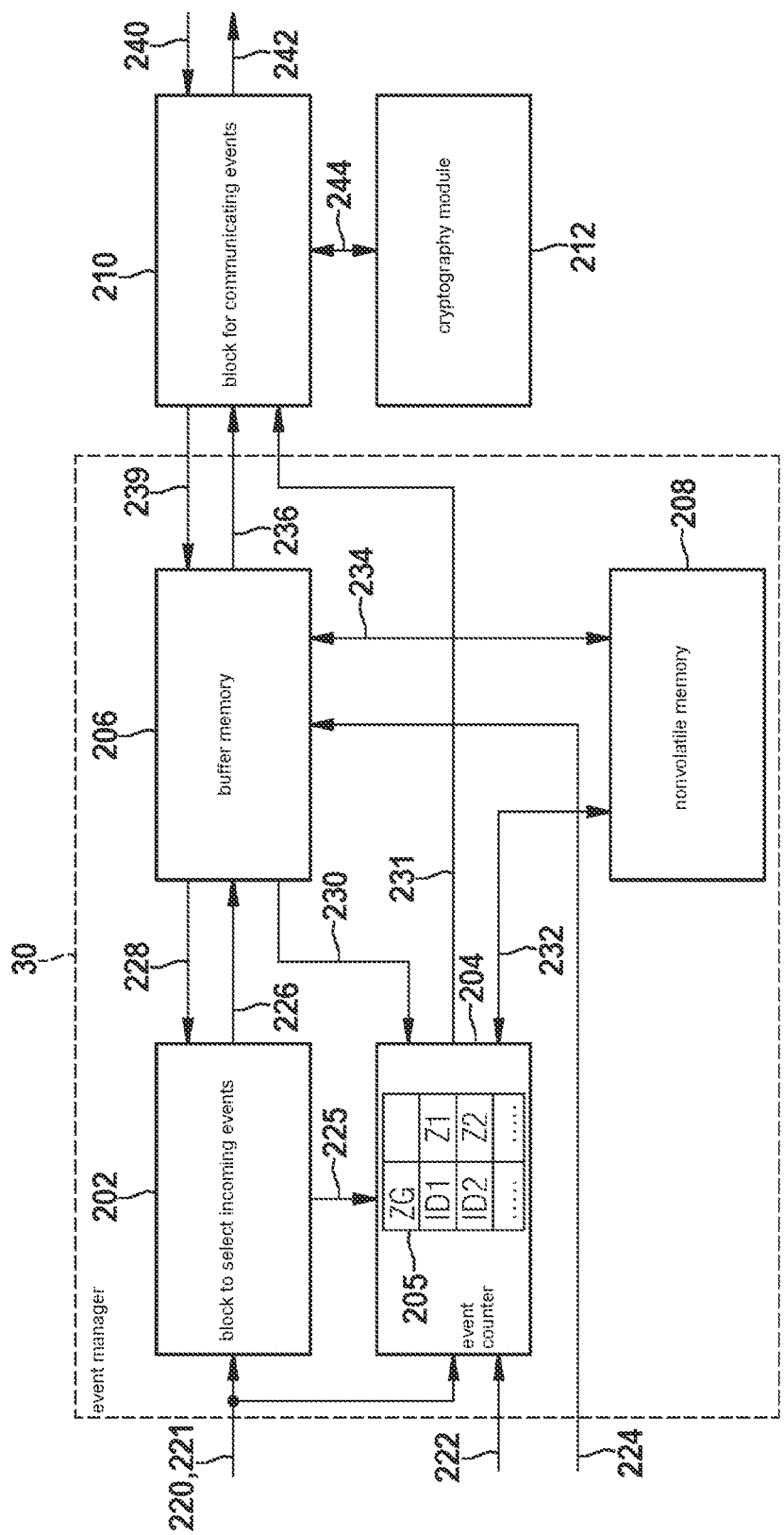
FIG. 3 shows a more detailed configuration of an event manager.

The configuration of event manager 30 is shown in greater detail according to FIG. 3. Event manager 30 includes multiple functional blocks that are in interaction with one another. Each of events 220 or reduced events 221 arrives at a block 202. Block 202 is used to select incoming events 220 or reduced events 221 that are to be further processed. In particular, block 202 is used to prioritize and reduce events 220, 221.

Each event 220 or each reduced event 221 likewise arrives at a block 204 that is used as a counter 204 for events 220, 221. For an occurred event 220, 221, a corresponding counter, in particular a global event counter 205, is incremented. Counter 204 particularly preferably includes different counters $Z_1, Z_2, \ldots Z_n$ for different event types 218 (ID1, ID2, . . . IDn), as explained in greater detail above in conjunction with corresponding sensors 24, 26, 28. Global event counter 205 in turn represents the sum of all counter contents of counters $Z_1, Z_2, \ldots Z_n$ for different event types 218 (ID1, ID2, . . . IDn). Output signal 231 of block 204 or counter contains the counter contents of all events 220, 221, i.e., counter contents of particular event-dependent counters $Z_1, Z_2, \ldots Z_n$ and of global event counter 205. Corresponding output signal 231 from block 204 is supplied to a block 210 for communicating events 220. Block 204 is configured to receive a reset signal 222, which represents a reset request to the counter or to event counters 204, 205. Block 204 obtains from block 202 a signal for a reduction status 225, for example "event reduction active." In block 202, an event reduction is active, for example, when only a reduced number of certain events 220, 221 are further processed as selected events 226. This is the case in particular when, for example, within the scope of a so-called event burst, a large number of events 220, 221 arrive with an increased fill state 228 of buffer memory 206. In this case, an additional event 220 is to be generated, for example with an event type 218 "event reduction active" as described above. For this event 220' with associated event type 218, there is then likewise a corresponding counter or counter content.

The events processed by block 202 arrive as selected events 226 at a block 206, which is used as a memory or buffer memory for selected events 226 that are supplied from block 202, and which includes the appropriate logic for this purpose. In turn, memory 206 reports the fill state or memory allocation 228 back to block 202. Memory 206 is preferably a volatile memory, in particular a buffer memory of a RAM. In addition, time signal 224, in particular a global time signal 224, arrives at memory 206 or at the block for buffering selected events 226. Memory 206 is an integral part of event manager 30.

Certain events 236 stored or buffered in memory 206 arrive at a block 210 that is used to communicate event reports 242 as a function of selected events 226 or stored events 236. Block 210 for communicating events also obtains output signals 231 of event counter 204, for example counter contents of counters $Z_1, Z_2 \ldots Z_n$ for particular event types 218 and/or the counter content of global event counter 205. Block 210 for communicating events, in particular event reports 242, exchanges signals 244 with a cryptography module 212. The cryptography module carries out cryptography operations such as encryption operations, authentication operations, as well as random number generation, etc. An encrypted communication of block 210 to the outside may take place with the aid of cryptography module 212. Cryptography module 212 carries out in particular an encryption of event report 242, using encryption 257 indicated in FIG. 2d. Cryptography module 212 may likewise carry out an authentication of event report 242 using authentication information 256 (also cf. FIG. 2d). Block 210 may reside in communication adapter 32 and/or in event manager 30. Block 210 outputs appropriate event reports 242. Block 210 receives a request command 240 to read out corresponding events 236 stored in memory 206, 208. Request command 240 may take place cyclically and/or in response to an explicit request. In addition, block 210 sends a signal 239 (event enablement) to memory 206. After a successful transfer of associated event reports 242, which also contain stored events 236 or selected events 226, memory 206 or 208 is thus generally notified that stored and further communicated events 236, 226 are allowed to be overwritten or deleted.

In addition, a further memory 208, in particular a nonvolatile memory, is provided in event manager 30. Certain events 234 that have been buffered in buffer memory 206 and/or counter contents of event counter 204 are permanently stored in further memory 208, which in particular is nonvolatile. For this purpose, memory 208 exchanges data with event counter 204 and/or with buffer memory 206.

Figure 4:
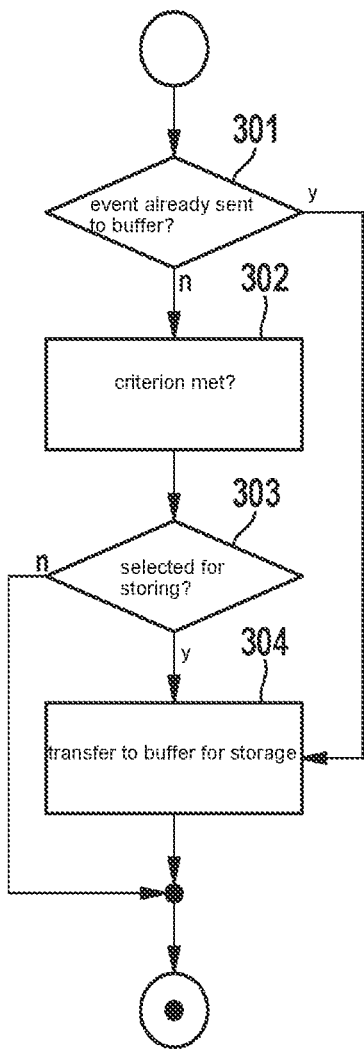
FIG. 4 shows a flowchart for selecting an event to be further processed.

The mode of operation of block 202 for prioritizing and reducing events 220 is described in greater detail below with reference to FIG. 4. The mechanism described below is used to select whether supplemental helpful (and memory-intensive) metadata 215 are to be stored for an event 220, 221. In a further generalization, block 202 is used to select, from events 220, 221 supplied to event manager 30, the events that are to be further processed as selected events 226. For each event type 218 of obtained event 220, 221, it is tracked whether this is the first occurrence of this certain event type 218, or whether an event 220 with this event type 218 has already been sent to memory or buffer 206 (query 301). For the first occurrence of an event type 218, block 304 follows, in which particular event 220, as selected event 226, is transferred to buffer 206 and stored there. Otherwise, block 302 follows. In this step 302, it is decided according to a certain criterion whether event 220, 221, which has already occurred with regard to event type 218, is nevertheless to be stored. This takes place, for example, after a random selection of event 220, 221, in particular based on a random number 273. This random selection could particularly preferably be based on a control unit-specific or vehicle-specific random number 273. An intelligent algorithm is to be used for the random selection in order to limit overflow of buffer memory 206 in worst case intrusion scenarios (prolonged intrusion with so-called event bursts). On the other hand, a reasonable number of stored events 236 or selected events 226 or log entries should be obtained in normal scenarios in order to capture the largest possible spectrum over the complete intrusion. For this purpose, event 220 selected in step 302 is transmitted to memory 206 in step 303 as selected event 226 for storing.

If the event has thus now been selected according to random criteria according to step 302 (query 303), this event 220, 221, as selected event 226, is also sent to memory 206 (step 304). Otherwise, the program sequence ends without storing this event 220, 221 in memory 206 or without supplemental storage of further metadata 215 concerning event 220. The monitoring of the first occurrence of event type 218 is reset when memory 206 is read out and communication has taken place via block 210. If an event 220, 221 has not been selected or discarded, the state "event rejected" is triggered for each discarded event 220, 221. For this purpose, a further counter 204 that records the number of unselected events 220 is particularly preferably to be provided.

For an additional prioritization, events 220, 221 could optionally be grouped as a function of particular event type 218, and a dedicated entity for the random event reduction could be provided for each event type 218. A prioritization may additionally be achieved by group formation. This means that event types 218 are assigned to different priority groups. Certain event types 218 (for example, event types 218 with ID numbers ID1, ID6, ID14, ID23, etc.) are assigned to the priority group having highest priority (Prio 1), associated further event types 218 (for example, event types 218 with ID numbers ID2, ID5, ID12, ID27, etc.) are assigned to a priority group having the next lower priority (Prio 2), associated further event types 218 (for example, event types 218 with ID numbers ID3, ID9, ID13, ID19, etc.) are assigned to a priority group having a next lower priority (Prio 3), etc. For different priority groups (Prio1, Prio2, Prio3, . . . ), on average different numbers of events 220 are randomly selected as selected events 226 (N1: number of selected events for priority group 1 (Prio1), Nx: number of selected events for priority group x (Prio_x)). For priority groups having high priority, on average more events 220 are randomly selected than for priority groups having low priority (N1>N2 . . . ). This could be achieved, for example, by selecting ranges B1, B2 . . . Bx (with associated priority groups Prio1, Prio2 . . . Prio_x) or the number from which an event 220 is selected to be smaller the higher the priority is (B1<B2 . . . ).

Selected events 226 are stored in volatile memory 206. However, selected events 226 are not to be directly stored in nonvolatile memory 208, since too frequent storage could damage nonvolatile memory 208. Storing selected events 226 in nonvolatile memory 208 could take place randomly, for example as explained in greater detail in conjunction with FIG. 6.

Memory or memories 206, 208 may deal with selected events 226 having different sizes. Memory 206 is shown here by way of example in FIG. 7. Memory 206 includes a free memory area 250 and a filled memory area 252. Multiple selected events 226 or 226 are stored in filled memory area 252. Entries 226 may each have different sizes. Optimal use of the memory space is made by the nonrigid division of memory areas. If memory 206 is full, new selected events 226 are discarded. However, in principle, as discussed below, complete filling of memory 206 is prevented by a self-regulating mechanism. Thus, for a very high fill state 228 of memory 206, on average many fewer events 220 are randomly selected than for a low fill state 228 of memory 206. However, if selected events 226 are discarded due to a full buffer 206, then an event counter for a new event type 218 "logging buffer overflow (overflow of memory 206)" is implemented to ascertain the number of discarded events or entries. As shown in FIG. 3, this may take place, for example, by status 230 of memory 206 being communicated to counter 204, or by this signal 230 always sending a pulse to counter 204 when once again a further selected event 226 cannot be stored due to a full memory 206.

As soon as all stored events 236 or selected events 226 have been successfully reported to an external data logger in the control unit, for example, via block 210 within the scope of an event report 242, buffer 206 is enabled to overwrite or delete events 226 in question (signal 239 (free event)). The writing of events 236 in particular into a nonvolatile memory 208 such as a flash memory could advantageously be mapped via a non-AUTOSAR memory mechanism in order to ensure memory efficiency and meet performance requirements. However, there is also the option to utilize a standard AUTOSAR memory mechanism.

Figure 5:
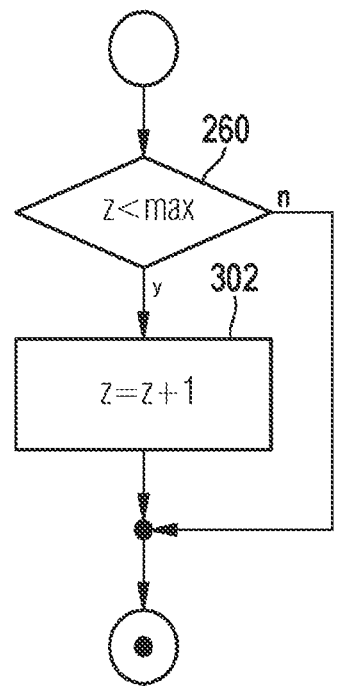
FIG. 5 shows a flowchart for the counter incrementation.

Event counter 204 is described in greater detail in conjunction with FIG. 5. A dedicated counter Z1, Z2 . . . Zn within the scope of event counter 204 is implemented for each event type 218. Event counter 204 in each case starts with the value zero. It is initially ascertained whether the counter content is still smaller than a maximum value (query 260). If this is the case, upon occurrence of an event 220, 221 of a certain event type 218, counter Z1, Z2 ... Zn increments for particular event type 218 (step 262). Otherwise, the counter content is held at the maximum value, and thus no overflow occurs. It is possible to reset event counter 204 to zero on request. Counter 204 could be implemented as a 32-bit counter, for example.

Figure 6:
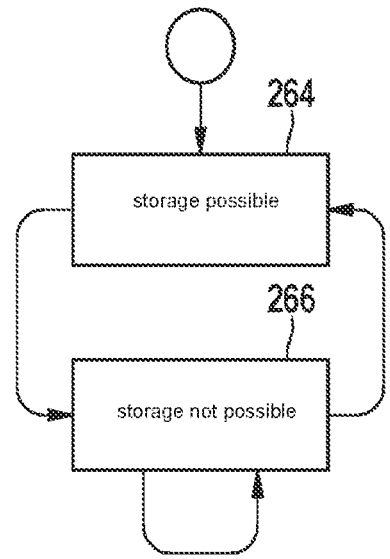
FIG. 6 shows a flowchart for storing a nonvolatile memory.

According to FIG. 6, the nonvolatile storage of event counter 204 and/or of certain selected events 226 in nonvolatile memory 208 is described. The data are to be stored in nonvolatile memory 208 at regular time intervals. Such time intervals are, for example, in the range of seconds, minutes, to hours; for example, a storage of the data takes place every 30 minutes. The point in time for the storage is to be randomly selected in order to make the writing procedure unforeseeable by an intruder. The memory cycles could take place randomly, for example within a certain interval (for example, within 30 minutes etc., but the exact point in time of the storage within the 30-minute interval, for example, is random). In turn, the random variable (for determining the point in time of the storage) could be generated or selected as a function of a random number 273 that is unique to the control unit or to the vehicle.

Alternatively, storage moments could be randomly selected in a time-controlled manner by multiplying a random number by a base time interval. Thus, for example, this involves a certain base time interval of 15 seconds, which is multiplied, for example, by a 3-bit random number or random number range of a random number 273. Random number 273 itself could be cyclically and/or randomly updated. Alternatively, random number 273 could be assigned individually on a control unit- or vehicle-specific basis, for example during the production and manufacturing. Alternatively, a certain range of random number 273 could be selected, on the basis of which the factor is formed as a function of the range of random number 273.

As soon as a new selected event 226 occurs and storage in nonvolatile memory 208 is possible, selected events 226 are stored in a nonvolatile manner. In addition, storage of selected events 226 (in memory 206) and/or further information such as counter content 232 of event counter 204 are/is initiated in nonvolatile memory 208 when a state change (which could also have been caused by an intruder) of the control unit concerning a loss of the present RAM content (and thus the loss of buffer memory 206), for example due to a requested reset or rest mode, is pending.

The data are to be stored in a redundant manner in order to make reconstruction possible, even if a portion of the data was corrupt. The authenticity and integrity of the stored data are to be checked or ensured after reading out from nonvolatile memory 208. Nonvolatile memory 208 is preferably situated in a trusted zone. It is assumed that the IC-internal memory is classified as trusted. A standard AUTOSAR nonvolatile memory (NVM) handler could be used for this purpose.

FIG. 5 shows an example of a state graph for storing selected events 226 in nonvolatile memory 208. The storage of data in nonvolatile memory 208 is possible in principle in a state 264 when this state 264 is reached. Storage in nonvolatile memory 208 is not possible in a state 266. A change from state 264 into state 266 takes place after the storage has taken place. A change back into state 264, in which storage is possible, takes place in a time-controlled manner. The time is preferably random, as described above. The system remains in state 266 (no storage) when the control unit does not prepare for a rest state or reset.

Figure 7:
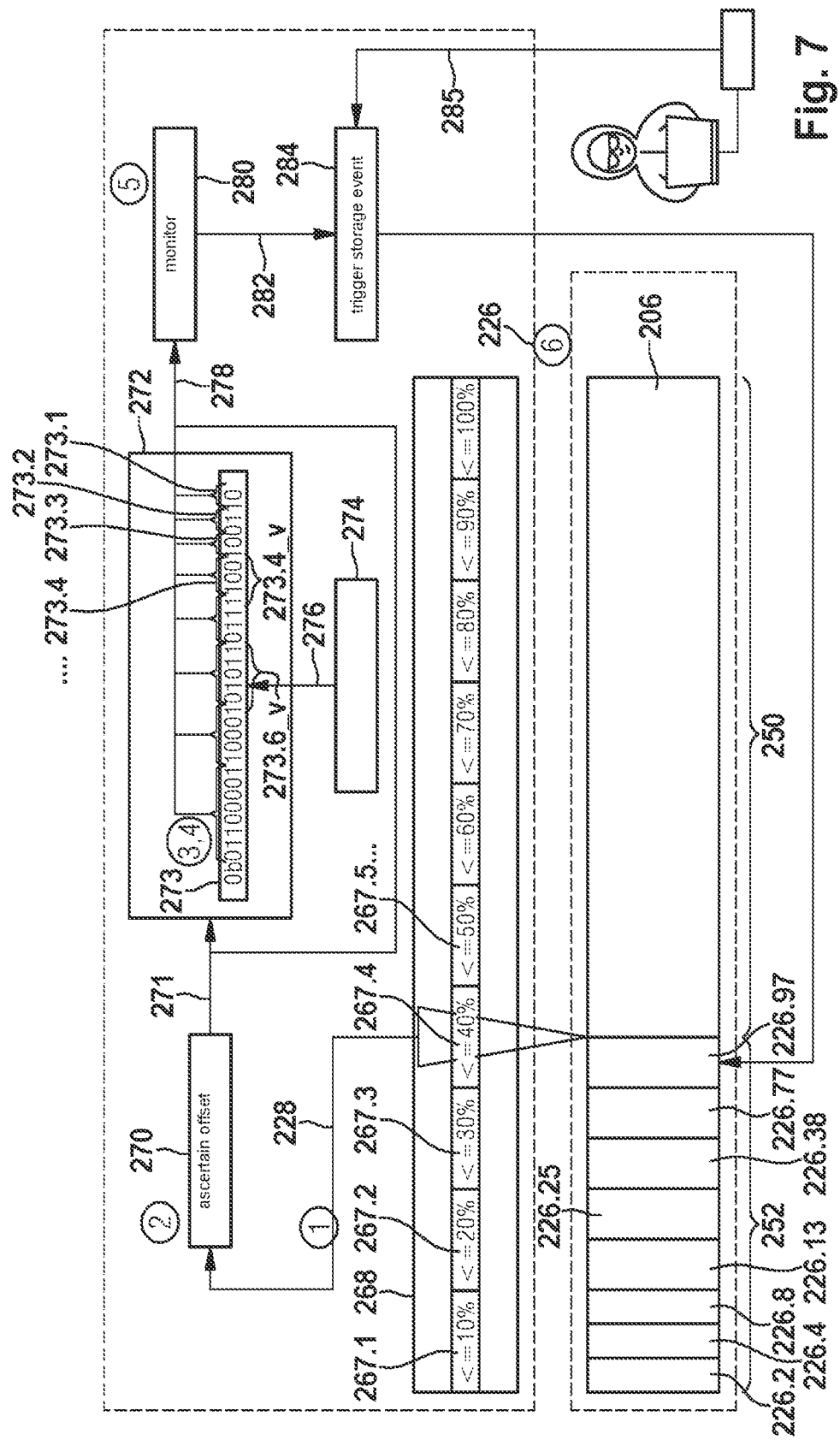
FIG. 7 shows a schematic overview of the random selection of an event to be stored.

FIG. 7 shows a more detailed illustration of the components of event manager 30. Multiple events 226 are stored in buffer memory or memory 206 and form filled memory area 252. As an example, an event number 2 (226.2), an event number 4 (226.4), an event number 8 (226.8), an event number 13 (226.13), an event number 25 (226.25), an event number 38 (226.38), an event number 77 (226.77), and an event number 97 (226.97) have been stored as selected events 226 in buffer memory 206. These selected events 226 have been selected, as described below, from a series of occurring events 220 (numbers 0 to 200, for example) according to a certain procedure and stored as selected events 226 in buffer memory 206.

The unfilled area or the remaining area of buffer memory 206 forms free memory area 250.

In the exemplary embodiment, corresponding fill state 228 of the shown memory allocation is formed by most recently stored selected event 226.97. The memory area of buffer memory 206 is now divided into multiple ranges 267 or fill state areas 267 between 0% and 100%. In the exemplary embodiment, these are, for example, ten (fill state) areas 267.1 through 267.10. In the exemplary embodiment, ranges 267 are always selected to be the same size, and in the exemplary embodiment these are 10% intervals. In the exemplary embodiment, memory 206 at that moment includes present area 267.4, i.e., fourth area 267.4, which is situated between 30% and 40% of the complete memory allocation.

Present memory area 267.4, in which present fill state 228 of memory 206 is present, is ascertained in functional block 268. Present fill state area 267, which in the exemplary embodiment is 267.4 for the fourth area, arrives at a block 270.

Offset 271 for the next event is ascertained in block 270. Offset 271 indicates from how many events 220 the next event 226 to be stored in memory 206 is to be selected. This number (offset 271) of events 220 from which the next event 226 to be stored is to be selected, in particular randomly, is a function of particular fill state 228 or associated memory area 267. For a low fill state 228 or memory area 267 (fill state 228 of memory 206 is relatively low), events 20 are stored more quickly; i.e., offset 271 is relatively small. With increasing fill state 228 or memory area 267, offset 271 increases; i.e., fewer events 220 are stored or only one event 220 is selected from a fairly large number (offset 271). An overflow of memory 206 may thus be delayed or prevented in a targeted manner. The random selection of next event 226 to be stored takes place within an offset 271. Only one event 220 (within offset 271) is always randomly selected or stored for each offset 271. Thus, on average, more or fewer events 220 are randomly selected or stored by varying the offset size as a function of fill state 228 of memory 206. Thus, as long as fill state 228 of memory 206 is within a certain range 227, event manager 30 always selects an event 226 to be selected from the same associated offset 271 until fill state 228 reaches next range 227 with a changed, generally increased, offset 271.

If memory area 267, defined by a lower or upper limiting value, is departed from, next offset 271 for the new range may be increased or decreased, for example by a certain factor or divisor.

As an example, a corresponding scenario is shown in the table according to FIG. 8, which results in an allocation of memory 206 as shown in FIG. 7. Offset 271 could be selected for different fill states 228 or memory areas 267 by way of example, as stated below. Thus, for example, for the memory area between 0 and 10% (267.1), offset 271 could be assigned to two (from zero to two, the selection thus taking place from three events 220), for the memory area between 10% and 20% (267.2), offset 271 could be assigned to 8 (from zero to eight, the selection thus taking place from nine events 220), for the memory area between 20% and 30% (267.3), offset 271 could be assigned to 32 (from zero to 32, the selection thus taking place from 33 events 220), and for the memory area between 30% and 40%, offset 271 could be assigned to 128 (from zero to 128, the selection thus taking place from 129 events 220), etc. A corresponding increase of the offset 271 for next memory area 267 could be made, for example, using an appropriate factor (4) or the like. Memory areas 267 as well as offset values 271 may be freely configured, and thus adapted to the particular desired situation, for example memory size, etc.

In subsequent block 272 in FIG. 7, next event 220 to be randomly stored (as a function of random number 273 as illustrated in FIG. 7 as an example) is now to be selected as a function of fill state 228 or memory area 267. It must be ensured that offset 271, i.e., the number of events 220 or the range of next events 220 to be considered, from which particular event 220 to be randomly stored is to be selected, may be covered by random number 273 or a corresponding range of random number 273. The size of the range of random number 273 to be considered is selected as a function of particular offset 271. If random number 273 is, for example, bit-encoded as illustrated in FIG. 7 as an example, for example for an offset 271 of two (0-2), initially a preliminary range of random number 273_temp preliminary having a size of two bits is selected. For an offset 271 of 8 (0-8), a range x of random number 273.x_v having a size of 4 bits is selected. For an offset 271 of 32 (0-32), a preliminary range of random number 273_v having a size of 6 bits is selected. For an offset 271 of 128 (0-128), a preliminary range of random number 273_v having a size of 8 bits is selected. The preliminary range of random number 273_v is shown in column 4, indicated there by way of example for specific random number 273 from FIG. 7. A check is subsequently made as to whether the section of random number 273 contained in preliminary range 273_temp is less than or equal to offset 271 for next memory area 276. If this is the case, preliminary range 273_v is also actually used as a section of random number 273.x as a random number range. The corresponding query in column 5 may be answered by "TRUE." For these cases, the temporary section of random number 273.x_v matches the selected section of random number 273.x. If this is not the case (query in column 5 is answered by "FALSE"), the preliminary section of random number 273.x_v is reduced in size. This may take place by omitting one bit, preferably the most significant bit (MSB). For the value of the random number in this range 273.x that then results, it may now be ensured that this value is within offset 271 for next memory area 267.

Thus, for example, for an offset 271 of 8 (0-8), initially 4 bits of random number 273 are considered in order to also cover the number 8 itself (size of present offset 271) (cf. columns with numerical buffer entries of 3, 4, 5 in FIG. 8). If the 4-bit value of associated preliminary random number range 273.5_v<=offset 271–event number 25, 273.5, for example =0b0111=7, this 4-bit number is directly used. The associated query is shown in column 5 in FIG. 8. Since the condition is met, the result is "TRUE."

If the 4-bit value of associated preliminary random number range 273.4_v>offset 271–event number 13, 273.4, for example =0b1100=12, this 4-bit number is not directly used, and instead the most significant bit (MSB) for the range of random number 273.4 under consideration is truncated, and the resulting 3-bit number 0b100=4 is used. The truncated MSB does not have to be discarded, and instead is entered as the least significant bit (LSB) of the next range of random number 273.5_v to be considered. In this case, the associated condition (is the corresponding random number range 273.3<=offset 271?) is not met (the associated result in column 5 is "FALSE"). By use of this procedure, it may be ensured that random number 273 is completely used and is not expended too quickly.

For ascertaining the size of random number range 273.x (for example, the number of required bits for the range of random number 273), it must be ensured that the size (for example, the number of required bits) is sufficient for representing the size of offset 271 of associated memory area 267 of next event 220.

Thus, in the exemplary embodiment according to FIG. 8, according to row 1, for offset 271 of 2 (0-2) for selected random number 273.1 of 2, event number 2 (220.2, global event counter 285 is 2) is selected (after discarding events 220.0, 220.1 number 0 and number 1) as selected event 226.2. According to row 2, for next offset range 271 (still for 0-2), event number 1 is randomly selected based on this offset range 271. Event number 0 in this offset range 271 has been discarded (corresponding to global counter content 285 of 3), but event number 1 in this offset range 271 has been selected (corresponding to global counter content 285 of 4, resulting in selected event 226.4). Next offset range 271 according to row 3 is still 2 (0-2), since fill state 267 of buffer 206 is still in range 267.1 between 0% and 10%. The random number for 273.3 is 2, so that after event numbers 0 and 1 are discarded in this offset range 271, event number 2 is selected (global counter content 285 is 8, selected event 226.8). Since fill state 267 is subsequently present in next fill state area 267.2, new offset 271 now changes to 8 (0-8). As described above, the next 4 bits of preliminary random number range 273.4_v are now considered. Since the associated random number of preliminary random number range 273.4_v, which is 12, is greater than present offset 271 (query 12<=8 in column 5 results in "FALSE"), the most significant bit of preliminary random number range 273.4_v is not used, and instead only the least significant 3 bits are used within the scope of selected random number range 273.4 (binary 100, i.e., 4). For this new offset range 271 of 8 (0-8), event number 0 (global counter content 285 is 9) to event number 3 are thus discarded, and event number 4 (global counter content 285 is thus 13) is selected as selected event 226.13. As an example, FIG. 8 summarizes the corresponding values for further fill states 267.

Thus, in block 272 it has not been randomly ascertained which event 220 is selected next as selected event 226. Corresponding block 280 now monitors the occurrence of new events 220 (block 284). It has been previously established, for example, that after stored event 226.8 (8th event), event 226.13 (13th event) is the next to be stored. Block 280 thus waits for event number 13, discards the next event numbers 9 through 12, and stores only event number 13 as selected event 226.13 in memory 206. New fill state 228 of memory 206 is ascertained as a function of new selected event 226 together with a data size of metadata 215 (event-dependent metadata 216 and generic metadata 217). This could take place in a particularly simple manner, for example, using length 232 as already contained in metadata 215.

Random number 273 is to be selected differently for different control units or vehicles 18. Thus, in production, for example, random number 273 could be assigned once for each individual vehicle or control unit. Alternatively, random number 273 itself could be newly generated internally according to certain rules. The new generation could take place, for example, during transitions from system states (during bootup, reset, transfer into a sleep mode, etc.) and/or cyclically according to certain time periods.

Based on the information in question, block 272 ascertains next event hit 278 (next event hit 278 in next offset 271). Next event hit 278 arrives at a block 280 ("throw the dice") in which on a random basis, supplied event 220 is either discarded (event 220 is not stored in buffer memory 206) or selected as selected event 226 for storage in buffer memory 206. If the selection takes place (event hit 282), block 284 follows. Block 284 is called up for each event 220. However, block 284 itself calls up (for each event 220) block 280, which provides feedback to block 284 as to whether or not event 220 is to be selected. If event 220 has been selected by block 280, then block 284 triggers the storage of event 220 as selected event 226 in memory 206.

The reading in of selected event 220 takes place in block 284 ("on event") for subsequent storage in free area 250 of buffer memory 206 as selected event 226. Block 284 is always called up for every new incoming event 220, 221. Block 284 is used for random selection, including possible reduction and prioritization of incoming events 220, 221.

In addition to the random selection in block 280, a random reduction of event 220 may also take place, for example as described above by use of ETH sensors 26. A certain data range (start of a preferably fixed data range, or end of a data range) may thus be randomly selected. Likewise, only certain reduced address data could be stored.

Likewise, for a high rate of occurrence of events 220 or in general, sensor 24, 26, 28 itself (for a certain source, for example Ethernet) could select or reduce events 220, a prefiltering in a manner of speaking, analogously to event manager 30 in order to relieve load on event manager 30 (into which events 220 of other sources are also entered). If sensor 24, 26, 28 is not already relaying individual events 220 to event manager 30, this is likewise to be communicated as an individual event type 218 to event manager 30 (analogously to reduction status 225 in event manager 30). In general, however, the event-dependent selection of events 220 could take place in sensor 24, 26, 28 itself and be stored in a buffer memory of sensor 24, 26, 28. Appropriate counters may likewise also be provided in sensor 24, 26, 28 for particular event types 218, which could be transmitted to event manager 30 as needed. In addition, upon request by event manager 30, events 226' selected by sensor 24, 26, 28 could be communicated to the event manager for possible relaying to higher-order entity 34 and/or to back end 36. The procedures for random selection and/or prioritization, described in conjunction with event manager 30, may still take place in sensor 24, 26, 28. Nevertheless, they may be limited solely to specific data 211 for the particular source; i.e., sensor 24, 26, 28 may thus select only sensor-specific events 220.

For increasing the security, communication adapter 32 could provide random sending, which is nondetermininistic for and concealed from an intruder, of an event report 242 to other IDS entities 34.

As described above in conjunction with FIG. 2d, an event report 242 is generated from selected events 226 that are stored in buffer memory 206. This event report includes selected events 226 that are stored in buffer memory 206. These selected events 226 are preceded by a variable 254 (for example, a random number, time, or counter, etc.) that is changed with respect to each event report 242. In addition, event report 242 includes a piece of authentication information 256 via which the authentication between communication adapter 32 and the unit that receives event report 242 (IDS entity 34, back end 36, or the like) may take place. Authentication information 256 could be formed, for example, from at least a portion of the data of event report 242, preferably from all data of event report 242 (of course, with the exception of authentication information 256 to be formed). For this purpose, an appropriate algorithm is stored in event manager 30. For purposes of authentication, a higher-order unit 34 and/or back end 36 may be similarly formed from the corresponding data of received event report 242 after decryption of associated authentication information 256', and compared to actually received authentication information 256 as in event report 242. Authenticity is assumed when there is a match.

Event report 242 has a fixed length 258. To achieve this fixed length 258, data 254, 215_1, 215_8, 215_190, 256 are further filled by so-called padding data 255. These padding data 255 contain no event-relevant information. Prior to a transfer, the shown data of event report 242 are provided with encryption 258, as indicated in FIG. 2d. Event report 242 which is thus encrypted by encryption 258 is sent by communication adapter 32, and is decrypted and authenticated by further IDS entity 34 or back end 36 as described. Even if variable 254, which changes for each event report 242, differs by only 1 bit, for example, subsequent encryption 258 results in encrypted event report 242 differing greatly (and not just in one bit) from preceding event report 242.

Certain events 220 could thus be transferred cyclically and with encryption (with a continually changing variable 254 as part of event report 242 in plaintext, and with encryption 258 of event report 242) within the scope of event report 242. However, even if no new events 220 are present, so-called dummy events (made up of padding data 255, for example) could be transferred cyclically and with encryption. This is used to protect against eavesdropping or to randomly conceal the data exchange between communication adapter 32 and further IDS entities 34 or back end 36.

The communication sequences between event manager 30 and communication adapter 32 within control unit or gateway 20, and between communication adapter 32 and at least one further IDS entity 34 inside vehicle 18, and between further IDS entity 34 and back end 36, are described below by way of example with reference to FIGS. 9 through 14.

The communication from the control unit, for example gateway 20, to a further IDS entity/entities 34 (for example, a central event logger inside vehicle 18) is to ensure that further IDS entity 34 or the event logger is informed about entries that are not read out or events 236 or selected events 226 that are stored in memory 206. Control unit or gateway 20 is to send an event report 242 to further IDS entity 34 on a regular basis, preferably via a so-called heartbeat signal (cyclic signal, which may be used to check for a proper connection of the communication users). The heartbeat signal (including event report 242) is to be encrypted and authenticated. The transmitted information is preferably to be authenticated (optionally using authentication information 256) and encrypted, preferably randomly or using a random number 273, and exchanged between control unit or gateway 20 and further IDS entity 34. Event report 242 should preferably have a fixed length 257 and be encrypted and authenticated. Each encrypted event report 242 should be different from the preceding event reports 242, even if the transmitted status has not changed.

The communication from further IDS entity 34 to control unit or gateway 20 or associated communication adapter 32 is also to be characterized by the following functionalities.

The data logger or IDS entity 34 is to read in events 236 or associated event reports 242 as quickly as possible to prevent an overflow in particular of the memory or buffer memory 206. It should be possible for event reports 242 to be read out via a diagnostic interface, for example upon request. Alternatively, event report 242 could be sent completely cyclically. Event reports 242 are to be communicated or read out on a regular basis, preferably with authentication and encryption or with masking, even if no new selected events 226 are available within the scope of a new event report 242. Control unit or gateway 20 is to respond, with encryption and authentication, to a readout request 240 with a response or an event report 242 having a fixed length. Each encrypted response or event report 242 should be different from the preceding responses or event reports 242, even if the content has not changed. As an example, this takes place via continually changing variable 254, as described above.

According to FIG. 9, event manager 30 initially selects a first selected event 226.1 and subsequently selects a second selected event 226.2. These are processed by event manager 30 as described. Selected events 226.1, 226.2 are thus stored in memory 206. Communication adapter 32 contains a signal 400, a time-dependent interrupt signal (timer IRQ). Time-dependent signal 400 is preferably formed cyclically, so that the sending of an event report 242 from communication adapter 32 to further IDS entities 34 in vehicle 18 is thus initiated cyclically. However, even if there are no new events 226.1, 226.2, as described below a signal (in the form of a "normal" event report 242) is sent from communication adapter 32 to further IDS entity 34 (cf. signal 406). However, the sending of an event report 242 is particularly preferably not triggered as a function of the receipt of an event 220 or selected event 226, but instead is triggered cyclically (via passage of the cycle time). This is particularly advantageous, since the subsequent transmission to further IDS entities 34 and/or to back end 36 also always takes place cyclically, i.e., after passage of a certain time period. Thus, the behavior of event manager 30 or anomaly detection is not apparent to an intruder. The intruder never knows whether his/her intrusion has been detected, what has been detected, or how the system for anomaly detection operates.

After communication adapter 32 has received signal 400 (timer interrupt), communication adapter 32 requests an event report 242 from event manager 30 (signal 402). Event manager 30 creates event report 242 in question, which includes previously selected events 226.1 and/or 226.2 (with respective generic metadata 217 and event-dependent metadata 216) as well as a changed variable 254. In addition, appropriate padding data 255 are added, so that fixed length 257 of event report 242 is achieved (with knowledge of the length of authentication information 256 yet to be formed). Furthermore, for example event manager 30 generates from changed information 254, selected events 226.1, 226.2, and padding data 255 a piece of authentication information 256, using a certain algorithm. Authentication information 256 thus formed completes event report 242. This is followed by the encryption of complete event report 242, using key 258. Encrypted event report 242 as signal 404 arrives at communication adapter 32. Encryption (using changed information 254 and/or key 258) and authentication (formation of authentication information 256) could take place in event manager 30 and/or in communication adapter 32 when the corresponding security requirements are met.

Alternatively, communication adapter 32 could encrypt event report 242, for example as a function of a random number 273. For the encryption, a new random number 273 is particularly preferably always formed, for example by hashing. This makes it more difficult to decrypt a transferred message or encrypted event report 242. Communication adapter 33 optionally takes over the authentication, using authentication information 256 and/or the addition of changeable variable 254 and/or the final encryption of entire event report 242 via encryption 258.

An appropriate signal 406 is sent to the timer interrupt (signal 400), even if no new event report 242 due to the occurrence of new selected events 226 is provided by event manager 30. A dummy message having the data format of an event report 242 is then used, and with encryption by a random number or continually changed variable 254 (using key 258) is transferred to further IDS entity 34. Dummy messages are also always encrypted using continually changed variables 254 or new random numbers, so that even when no new selected events 226 occur, other messages or encrypted messages (signal 406) are always cyclically transferred. The functioning of a proper communication link between communication adapter 32 and further IDS entity 34 may be checked due to the cyclical transfer.

After the message that is sent from communication adapter 32 (signal 406) is received by further IDS entity 34, further IDS entity 34 sends an acknowledgment signal (408) to communication adapter 32. After receipt of acknowledgment signal 408, communication adapter 32 generates a request to event manager 30 for buffered, optionally reduced, selected events 226 or associated event reports 242 to be deleted or once again overwritten (signal 410).

In one alternative exemplary embodiment, higher-order entity 34 and/or back end 36 checks the authenticity of received encrypted event report 242. For this purpose, higher-order entity 34 and/or back end 36 decrypt(s) the received message, namely, encrypted event report 242, using known key 258. Event report 242 is then available in plaintext. Event report 242 is authenticated using the appropriate algorithm (which has also been used by event manager 30 or communication adapter 32 to create authentication information 256) for forming authentication information 256. For this purpose, once again all data of received and decrypted event report 242 (with the exception of authentication information 256) are used, and a corresponding piece of authentication information 256' is formed therefrom. Formed authentication information 256' is subsequently compared to authentication information 256 that is received within the scope of event report 242. When there is a match, received event report 246 is considered to be authentic. In this variant, the further data communication with the higher-level or lower-level entity can occur only after authentication has taken place. In this embodiment, only after a successful authentication is signal 408 (acknowledgment signal) sent to communication adapter 32, which subsequently sends signal 410 for enabling the overwriting of selected events 226.1, 226.2 to event manager 30.

The response or acknowledgment signal 408, 416 should also preferably have a fixed length 257'. Acknowledgment signal 408 should preferably be authenticated and encrypted. Each response or acknowledgment signal 408 by higher-order entity 34 and/or back end 36 should be different, even if the content has not changed.

Figure 9:
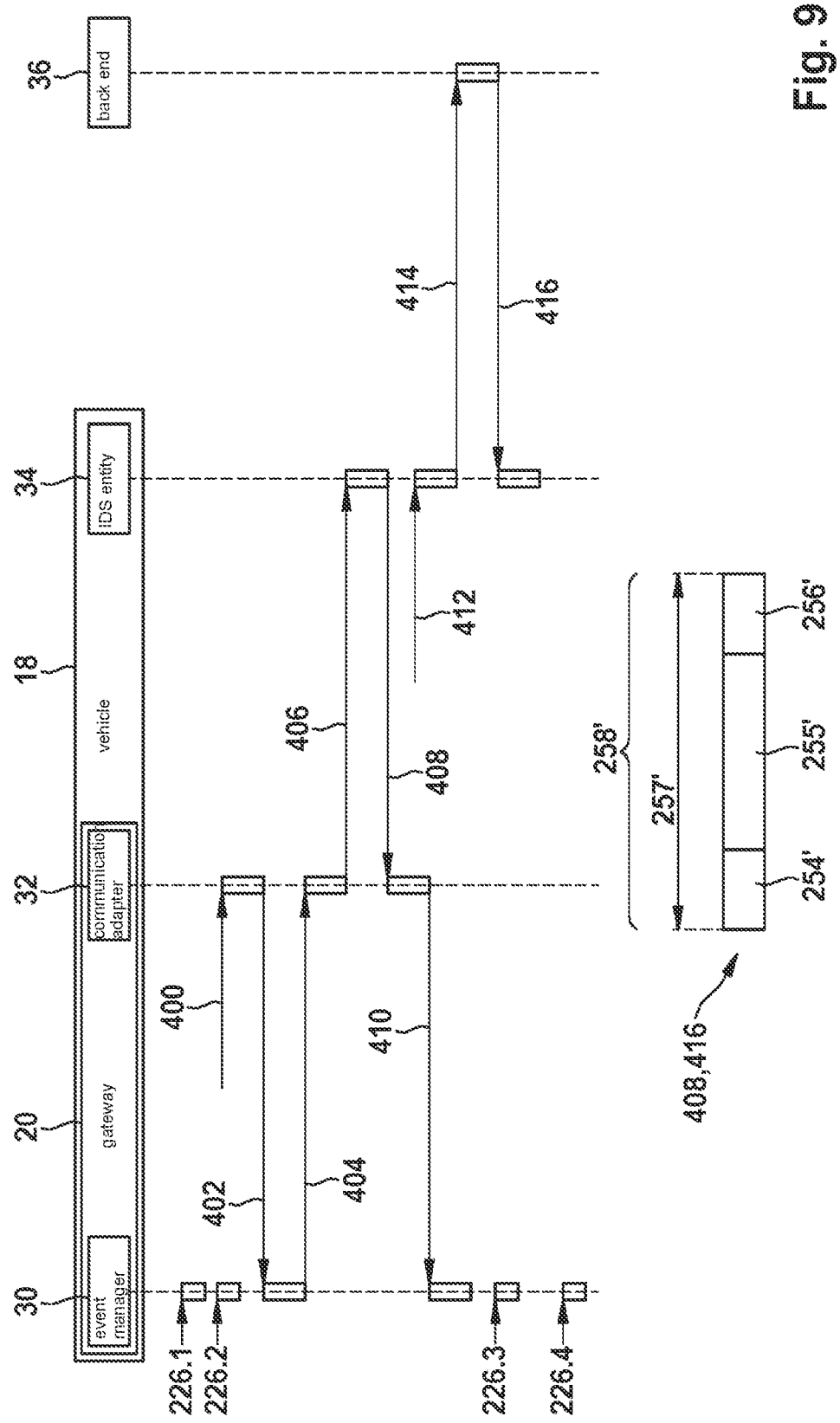
FIGS. 9 through 14 show different communication sequences between an event manager, a communication adapter, a further IDS entity, and a back end.
Figure 10:
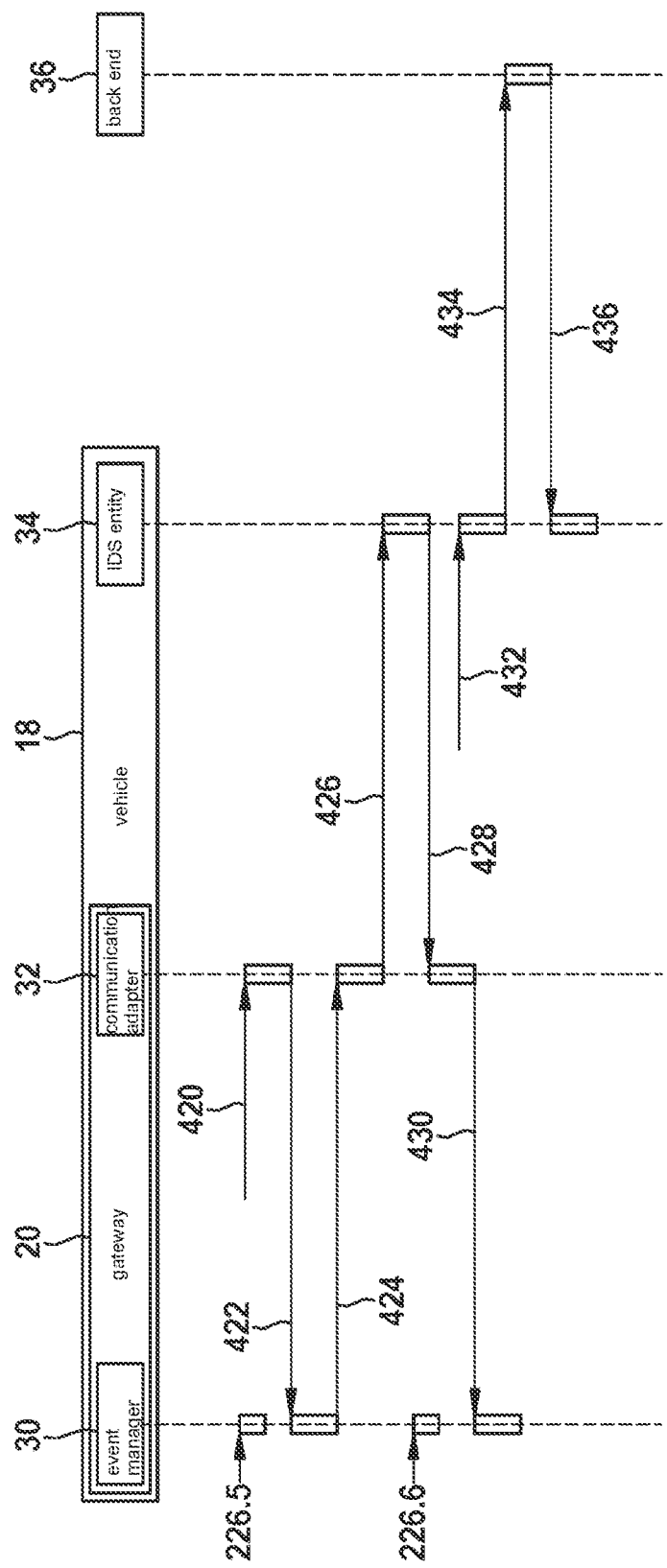

One example of such an acknowledgment signal 408, 416 is apparent in FIG. 9. Acknowledgment signal 408, 416 has a design that is similar to event report 242. Acknowledgment signal 408, 416 includes a changeable variable 254'. Changeable variable 254' changes for each newly sent acknowledgment signal 408, 416. Changeable variable 254' could once again be implemented by a random number, a counter, or a time, for example.

Changeable variable 254' of acknowledgment signal 408, 416 could particularly preferably be formed by using changeable variable 254 of event report 242 as it has just been transmitted. For this purpose, higher-order entity 34, 36 is configured to extract changeable variable 254 from received event report 242 and insert it into acknowledgment signal 408, 416. In a subsequent step, an authentication of acknowledgment signal 408, 416 could also thus take place by comparing received changeable variable 254' of acknowledgment signal 408, 416 to changeable variable 254 of event report 242 that has just been sent. When there is a match, an authentic acknowledgment signal 406, 408 is deduced. In addition, changeable variable 254' itself does not have to be generated in higher-order entity 34, 36. This may be followed by the enabling of memory 206.

In addition, acknowledgment signal 408, 416 includes certain data 255', for example in the form of arbitrary patterns. Furthermore, acknowledgment signal 408, 416 includes a piece of authentication information 256'. Authentication information 256', similarly as for event report 242, could once again be formed using a certain algorithm that relies on the remaining data of acknowledgment signal 408, 416, namely, changeable variable 254' and data 255'. Authentication information 256' thus formed completes acknowledgment signal 408, 416. Authentication information 256' has a fixed length 257'. An encryption using a key 258' then takes place. This encryption 258' could optionally also be dispensed with.

The receiving entities (higher-order entity 34 and back end 36, for example) and/or communication adapter 32 or event manager 30 are once again capable of decrypting acknowledgment signal 408, 412 (using key 258') and authenticating. For this purpose, once again based on the received data (changeable variable 254', data 255'), using an appropriately known algorithm, resulting pieces of authentication information 256" are ascertained and compared to obtained pieces of authentication information 256'. Authenticity is assumed when there is a match. If the pieces of obtained authentication information 256' are satisfactory, signal 410 could be generated for enabling memory 206. If pieces of authentication information 256' are not satisfactory, it would not be possible for this signal 410 to be generated, so that selected events 226 contained in memory 206 are not (yet) deleted.

In addition, further IDS entity 34 cyclically receives a timer interrupt signal 412, which is formed similarly to signal 400 as described above. Further IDS entity 34 once again sends an encrypted message, signal 414, on this interrupt signal 412. This message optionally contains event report 242 or a vehicle-related event report (with incorporation of further event reports), as transmitted via signal 406 upstream from communication adapter 32. The same as with communication adapter 32, the message is encrypted by further IDS entity 34, in particular using a continually changing variable 254' such as a random number 273. If communication adapter 32 has transmitted no event report 242, for example because no new selected event 226 occurred, once again a dummy message having the same data format as an event report 242 is used, and transferred to back end 36 with encryption (signal 414). Back end 36 sends an acknowledgment signal 416 and/or a further communication or request to overwrite events 236 that are buffered in buffer memory 206, or the like, to further IDS entity 34. Acknowledgment signal 416 may be formed as described above.

After receipt of signal 410 regarding the event enablement, event manager 30 selects further selected events 226.3 and 226.4. The further sequence is apparent in FIG. 10. In the meantime, event manager 30 also selects a further event 226.5. A timer interrupt (signal 420) newly arrives at communication adapter 32. The communication adapter now requests an event report 242 for gateway 20 (signal 422). Event manager 30 sends to communication adapter 32 an event report 242 that is based on selected events 226.3, 226.4, 226.5 (signal 424). After receipt of event report 242, communication adapter 32 sends event report 242, which is encrypted and authenticated using a new changeable variable 254 such as a random number, to further IDS entity 34 (signal 426). Further IDS entity 34 acknowledges the receipt via an acknowledgment signal 428. Acknowledgment signal 428 may be formed as described in conjunction with acknowledgment signal 408 (FIG. 9). After receipt of acknowledgment signal 428, communication adapter 32 once again sends a request to event manager 30 to overwrite or delete selected events 226.3, 226.4, 226.5 on which event report 242 is based (signal 430). Between the sending of signal 424 and the receipt of signal 430, in the meantime a further selected event 226.6 is selected. However, this selected event 226.6 cannot be overwritten yet, since this selected event 226.6 has not yet been the basis for an event report 242 already transmitted to communication adapter 32. In this regard, signal 430 does not pertain to overwriting selected event 226.6, but, rather, pertains merely to overwriting those selected events 226.3, 226.4, 226.5 that have already been transmitted within the scope of most recent event report 242.

For further IDS entity 34, a timer interrupt (signal 432) once again occurs, as described above. As a result, further IDS entity 34 is prompted to transfer event report 242, newly received in signal 426, to back end 36 with encryption (signal 434). Back end 36 acknowledges receipt of message 434 in question via a corresponding acknowledgment signal 436, which is sent to further IDS entity 34. Acknowledgment signal 436 could be formed in the same way as acknowledgment signal 408 or 416.

Figure 11:
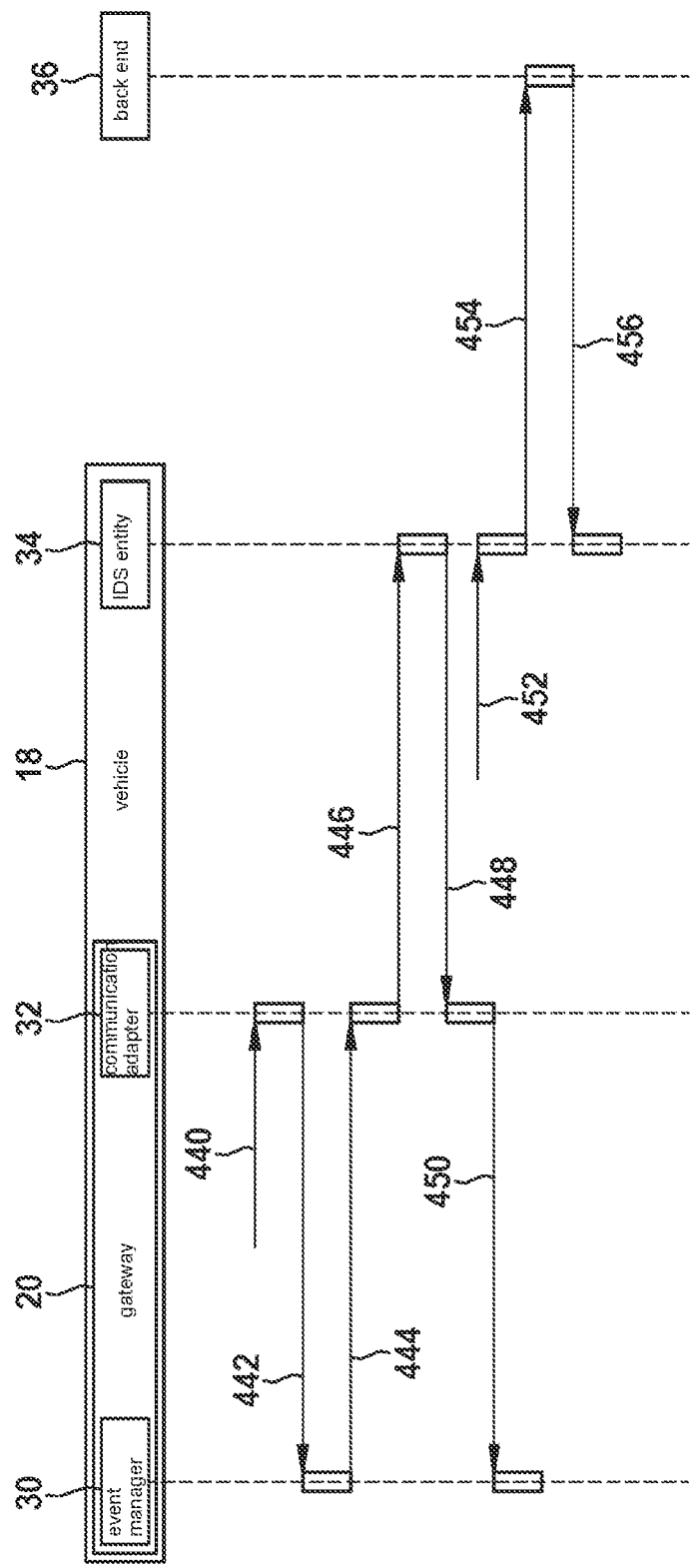

The further sequence is shown in FIG. 11. A further timer interrupt for communication adapter 32 occurs anew (signal 440). Communication adapter 32 subsequently sends a request to event manager 30 to send an event report 242 (signal 442). Event manager 30 sends an event report 242 containing event 226.6, which has been selected in the meantime (signal 444). Communication adapter 32 encrypts event report 242, using a new changeable variable 256, and sends encrypted event report 242 to further IDS entity 34 (signal 446). Upon receipt, further IDS entity 34 sends an acknowledgment (signal 448), upon receipt of which communication adapter 32 sends a request to event manager 30 to overwrite or enable already transmitted events 226.6 (450).

Further IDS entity 34 once again receives a timer interrupt (signal 452). Encrypted event report 242, optionally together with further vehicle-related event reports of further IDS systems, is subsequently transmitted to back end 36. Back end 36 sends an acknowledgment signal and/or a request to further IDS entity/entities 34 to enable or overwrite, etc., appropriate events (signal 456).

Figure 12:
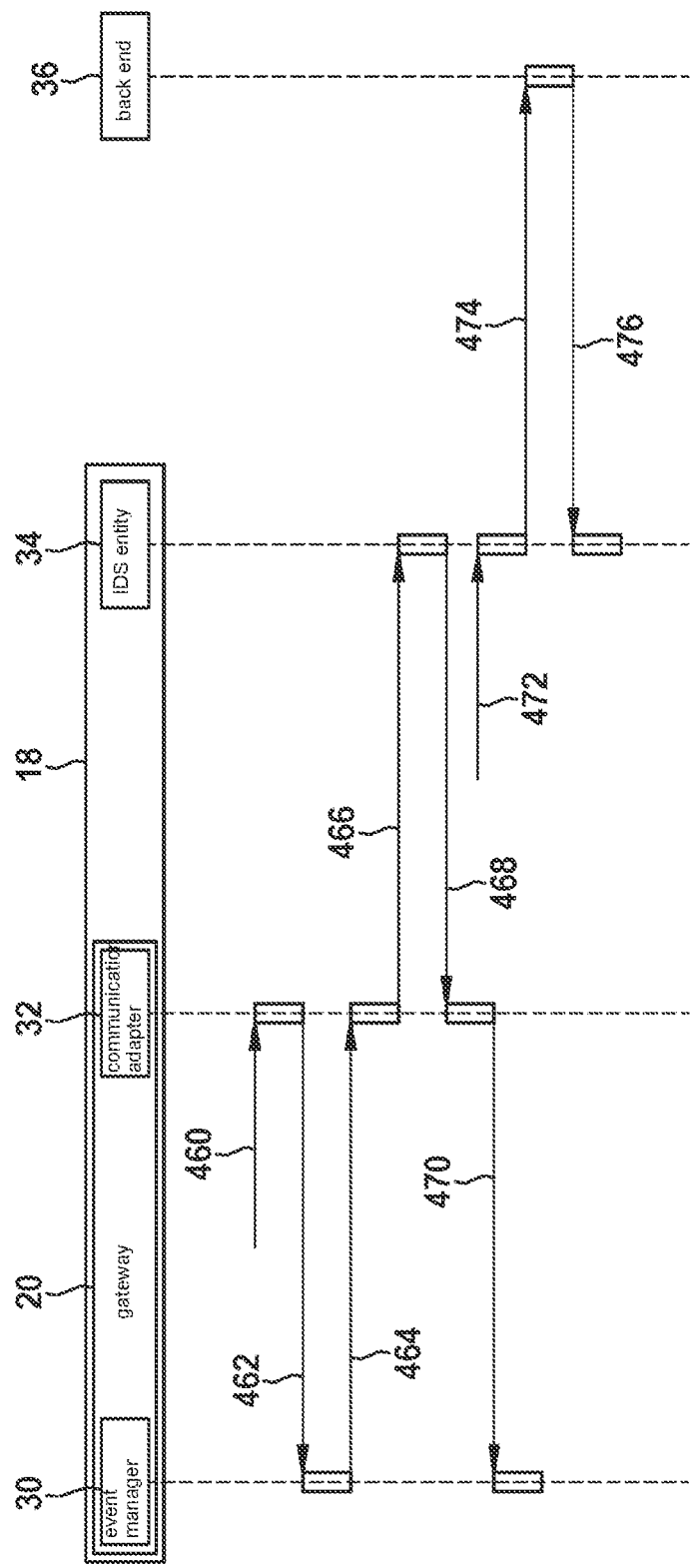

In the example of a sequence according to FIG. 12, no new selected event 226 has occurred between the sending of most recent event report 242 and the new occurrence of a timer interrupt (signal 460). After receipt of timer interrupt 460, communication adapter 32 sends an appropriate request signal 462 for a new event report 242 to event manager 30. Although new selected event 226 has occurred, event manager 30 generates an event report 242 with dummy content, which is then sent to communication adapter 32 (signal 464). This dummy content may be recognized as such by further IDS entities 34 and/or by back end 36. Communication adapter 32 encrypts received event report 242, which contains dummy content, using a new changed variable 254 and sends encrypted and authenticated event report 242 to further IDS entity 34 (signal 466). The receipt is acknowledged by further IDS entity 34 (signal 468). Upon receipt thereof, communication adapter 32 sends a new request signal to event manager 30 to overwrite most recently selected events 226 (signal 470). This takes place even if no new selected events 226 as in this configuration are present.

Further IDS entity 34 obtains a new timer interrupt (signal 472). Further IDS entity 34 subsequently encrypts most recently obtained encrypted event report 242 as transmitted by communication adapter 32, and sends it, optionally together with vehicle-related further event reports from further IDS systems, to back end 36. Back end 36 sends an acknowledgment signal 476 and/or a request to enable the underlying events, etc., to further IDS entity 34.

Figure 13:
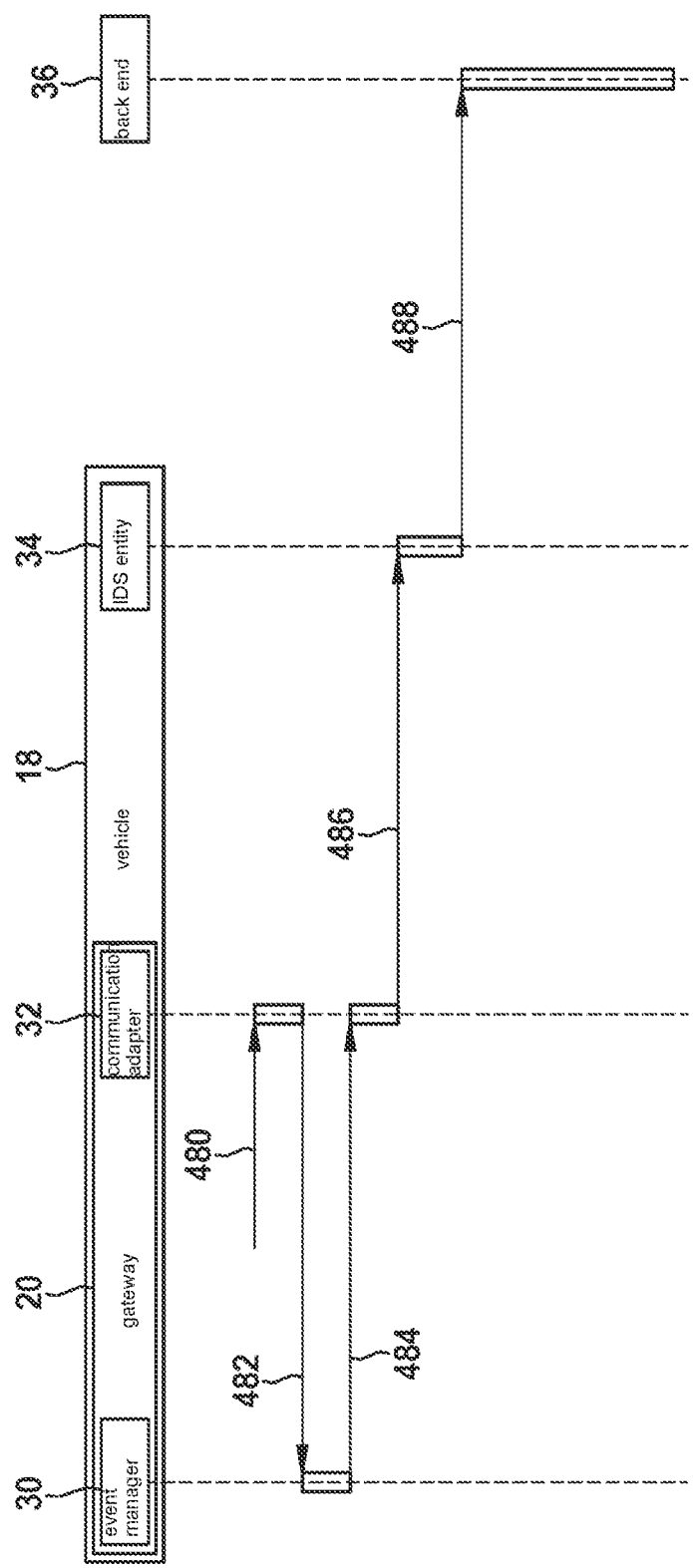

In the communication sequence in FIG. 13, communication adapter 32 obtains a new timer interrupt (signal 480). This timer interrupt 480 may be a specific signal, so that communication adapter 32 requests an event summary from event manager 30 (and not one of customary event reports 242) (signal 482). Event manager 30 sends the event summary to communication adapter 32 (signal 484). The event summary may contain higher-order pieces of information, such as various counter contents 231 for various event types 218, or the occurrence of a new event type, etc. Once again, the event summary is also encrypted by communication adapter 32, using a new changeable variable 254 such as a random number, and is transferred to further IDS entities 34 (signal 486). As soon as IDS entity 34 has obtained the encrypted event summary from communication adapter 32, further IDS entity 34 relays the event summary, particularly preferably in encrypted form, to back end 36. In the exemplary embodiment, for the sending operation between further IDS entity 34 and back end 36, no timer interrupt for initiating the communication operation is provided. Alternatively, however, the communication operation as well as the sending of a customary event report could once again be initiated cyclically.

Figure 14:
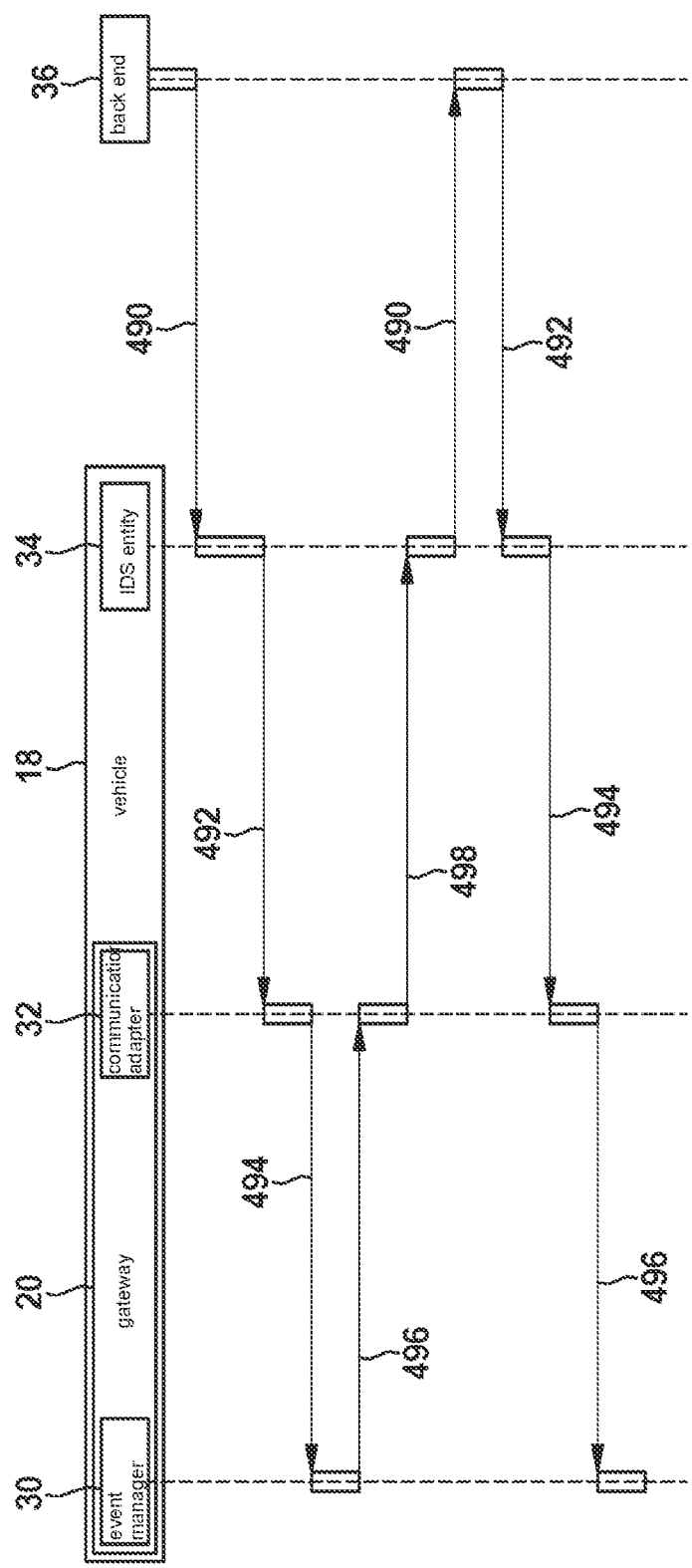

In the communication sequence in FIG. 14, back end 36 sends a request for an event report to further IDS entity 34 (signal 490). Further IDS entity 34 sends an encrypted request for an event report, for example via a diagnostic interface, to communication adapter 32 (signal 492). The encryption may once again take place using changeable variable 254' such as a random number, which in particular changes for each encryption. After receipt of request 492, communication adapter 32 sends a request for an event report 242 to event manager 30 (signal 494). After receipt of request 494 in question, event manager 30 sends event report 242 to communication adapter 32 (signal 496). Communication adapter 32 encrypts event report 242, for example using a new changeable variable 254 such as a random number, and sends it to further IDS entity 34 (signal 498). After receipt of encrypted event report 242, further IDS entity 34 sends event report 242 to back end 36. Back end 36 acknowledges receipt to further IDS entity 34 (signal 492). Further IDS entity 34 acknowledges the receipt of acknowledgment signal 492 to communication adapter 32 (signal 494). After receipt of signal 494 in question, communication adapter 32 sends an appropriate request to event manager 30 to enable or overwrite at least events 220 that are transmitted within the scope of most recent event report 242.

The described method may be implemented in a processing unit, computer, or controller, in particular in a control unit of a vehicle 18. Likewise, the method may be set up within the scope of a computer program that is configured to carry out the method when it is executed on a computer. In addition, the computer program may be stored on a machine-readable memory medium. Nevertheless, the program may be run, for example, wirelessly "over-the-air" as software or in a hard-wired manner via diagnostic interfaces.

What is claimed is:

1. A method for handling an anomaly of data in a motor vehicle, the method comprising:
    obtaining data, by at least one sensor, for the anomaly detection;
    examining the obtained data, by the sensor, for anomalies; and
    generating an event, by the sensor, as a function of the obtained data when an anomaly is detected;
    generating an event report as a function of the event;
    wherein the event report includes at least one variable that at least one of changes for each event report cyclically sent,
    wherein in absence of a new event, the event report is created based on a dummy message that is cyclically transmitted with encryption.

2. The method as recited in claim 1, wherein at least one of a random number or a time or a counter are/is used as a variable that changes for each event report.

3. The method as recited in claim 1, wherein the event report is transferred to at least one of a higher-order entity in the motor vehicle or to a back end outside the motor vehicle.

4. The method as recited in claim 1, wherein an event manager obtains events from multiple sensors and generates the event report.

5. The method as recited in claim 3, wherein the event report is cyclically transferred even when no new event has occurred since a most recent event report was sent.

6. The method as recited in claim 1, wherein the event report includes at least one of a piece of authentication information or at least one selected event or padding data.

7. The method as recited in claim 6, wherein the authentication information is formed by further pieces of information contained in the event report.

8. The method as recited in claim 5, wherein the event report at least one of always has the same length or is encrypted using a key.

9. The method as recited in claim 1, wherein the event report at least one of is transferred cyclically or in encrypted form from a further entity for intrusion detection to a back end.

10. The method as recited in claim 1, wherein after proper receipt of the event report by a unit that receives the event report, an acknowledgment signal is sent to the unit that sends the event report.

11. The method as recited in claim 10, wherein the unit is a communication adapter.

12. The method as recited in claim 3, wherein at least one of the transferred event report is decrypted, or data contained in the event report are used to form a piece of authentication information that is compared to the authentication information contained in the event report, and an acknowledgment signal is sent when the formed pieces of authentication information match the obtained pieces of authentication information.

13. The method as recited in claim 10, wherein a received acknowledgment signal is evaluated as to whether a changeable variable contained therein matches the changeable variable of the previously sent event report.

14. The method as recited in claim 10, wherein after the receipt of the acknowledgment signal, a signal for enabling or overwriting a memory is obtained, in which at least one selected event is contained as an integral part of the most recently sent event report.

* * * * *